(12) United States Patent
Koike et al.

(10) Patent No.: US 7,223,716 B1
(45) Date of Patent: May 29, 2007

(54) CERAMIC SUPPORT CAPABLE OF SUPPORTING A CATALYST, A CATALYST-CERAMIC BODY AND PROCESSES FOR PRODUCING SAME

(75) Inventors: Kazuhiko Koike, Nishio (JP); Tomohiko Nakanishi, Nishio (JP); Takeshi Ueda, Kariya (JP); Masakazu Tanaka, Okazaki (JP)

(73) Assignees: Nippon Soken, Inc., Nishio-shi (JP); Denso Corporation, Kariya (JP)

( * ) Notice: Subject to any disclaimer, the term of this patent is extended or adjusted under 35 U.S.C. 154(b) by 0 days.

(21) Appl. No.: 09/546,227

(22) Filed: Apr. 10, 2000

(30) Foreign Application Priority Data

Apr. 9, 1999 (JP) ................................. 11-102547
Feb. 24, 2000 (JP) ............................. 2000-047467

(51) Int. Cl.
    *B01J 23/02* (2006.01)
(52) U.S. Cl. ...................................... 502/439; 502/341
(58) Field of Classification Search ................ 502/439, 502/527.19, 353, 305, 324, 355, 349, 325, 502/343, 345, 341
See application file for complete search history.

(56) References Cited

U.S. PATENT DOCUMENTS

| | | | |
|---|---|---|---|
| 3,885,977 A | | 5/1975 | Lachman et al. |
| 3,943,064 A | * | 3/1976 | Ballain et al. ........... 252/455 R |
| 3,956,186 A | * | 5/1976 | Iwase et al. ............. 252/455 R |
| 4,189,405 A | * | 2/1980 | Knapton et al. ......... 423/213.5 |
| 4,194,917 A | | 3/1980 | Sakemi et al. |
| 4,301,037 A | | 11/1981 | Sanchez et al. |
| 4,313,853 A | | 2/1982 | Sherwood et al. |
| 4,347,063 A | | 8/1982 | Sherwood et al. |
| 4,414,256 A | | 11/1983 | Sherwood et al. |
| 4,474,731 A | | 10/1984 | Brownlow et al. |
| 4,495,300 A | | 1/1985 | Sano |
| 4,526,873 A | | 7/1985 | Beall et al. |
| 4,587,067 A | | 5/1986 | Agrawal et al. |
| 4,654,319 A | | 3/1987 | Kim et al. |
| 4,722,916 A | | 2/1988 | Watanabe et al. |
| 4,772,580 A | | 9/1988 | Hamanaka et al. |
| 4,849,275 A | | 7/1989 | Hamaguchi et al. |
| 4,869,944 A | * | 9/1989 | Harada et al. ............... 428/116 |
| 4,877,670 A | * | 10/1989 | Hamanaka ................... 428/116 |
| 4,927,799 A | * | 5/1990 | Matsumoto et al. ......... 502/303 |
| 4,956,329 A | * | 9/1990 | Chao et al. .................. 502/251 |
| 4,958,216 A | | 9/1990 | Tanaka et al. |
| 5,075,276 A | | 12/1991 | Ozawa et al. |
| 5,177,041 A | | 1/1993 | Horiuchi et al. |
| 5,273,723 A | * | 12/1993 | Gustafson ................... 422/177 |
| 5,275,771 A | | 1/1994 | Bush et al. |
| 5,346,722 A | * | 9/1994 | Beauseigneur et al. ..... 427/300 |
| 5,370,920 A | | 12/1994 | Forsythe et al. |
| 5,439,865 A | * | 8/1995 | Abe et al. .................... 502/302 |
| 5,529,732 A | | 6/1996 | Ideguchi et al. |
| 5,552,349 A | | 9/1996 | Ichii et al. |
| 5,567,663 A | | 10/1996 | Kotani et al. |
| 5,607,885 A | * | 3/1997 | Ichii et al. ........................ 501/9 |
| 5,628,883 A | * | 5/1997 | Sugiyama et al. ...... 204/192.32 |
| 5,688,740 A | | 11/1997 | Bolshakov et al. |
| 5,716,899 A | * | 2/1998 | Guile et al. .................. 502/439 |
| 5,750,459 A | * | 5/1998 | Marella et al. .............. 502/304 |
| 5,773,103 A | | 6/1998 | Ciora, Jr. et al. |
| 5,935,897 A | | 8/1999 | Trubenbach et al. |
| 6,027,684 A | | 2/2000 | Gheorghiu et al. |
| 6,099,793 A | | 8/2000 | Dull et al. |
| 6,171,573 B1 | * | 1/2001 | Sato .......................... 423/626 |
| 6,194,650 B1 | | 2/2001 | Wakayama et al. |

FOREIGN PATENT DOCUMENTS

| | | |
|---|---|---|
| DE | 19849340 A1 | 4/1999 |
| DE | 19908173 A1 | 9/1999 |
| EP | 0 271 919 A2 | 6/1988 |
| EP | 0671369 A2 | 9/1995 |
| EP | 1029836 A2 | 8/2000 |
| EP | 1029836 A3 | 2/2001 |
| JP | S50-75611 A | 6/1975 |
| JP | 51-37908 | 3/1976 |
| JP | S54-100409 A | 8/1979 |
| JP | 56-150435 | 11/1981 |
| JP | 60-7537 | 4/1982 |
| JP | 58-30337 | 2/1983 |
| JP | 58-79869 | 4/1983 |
| JP | 58-183948 | 10/1983 |
| JP | 59-62324 | 4/1984 |
| JP | S59-142849 A | 8/1984 |
| JP | 60-41022 | 9/1985 |
| JP | S61-261259 A | 11/1986 |
| JP | S61-261260 A | 11/1986 |
| JP | 62-4441 | 1/1987 |
| JP | S62-004441 A | 1/1987 |
| JP | S62-027041 A | 2/1987 |
| JP | 63-248442 | 10/1988 |
| JP | S64-3067 A | 1/1989 |
| JP | 207842 A | 8/1990 |
| JP | 4-59049 | 2/1992 |
| JP | H04-227846 A | 8/1992 |

(Continued)

OTHER PUBLICATIONS

Patent Abstracts of Japan, vol. 1995, No. 11, Dec. 26, 1995 & JP 07 196363 A (Sumitomo Osaka Cement Co LTD) Aug. 1, 1995.

(Continued)

*Primary Examiner*—Edward M. Johnson
(74) *Attorney, Agent, or Firm*—Nixon & Vanderhye P.C.

(57) ABSTRACT

A ceramic support capable of supporting a catalyst comprising a ceramic body having fine pores with a diameter or width up to 1000 times the ion diameter of a catalyst component to be supported on the surface of the ceramic body, the number of the fine pores being not less than $1 \times 10^{11}$ pores per liter, is produced by introducing oxygen vacancies or lattice defects in the cordierite crystal lattice or by applying a thermal shock to form fine cracks.

8 Claims, 1 Drawing Sheet

FOREIGN PATENT DOCUMENTS

| | | |
|---|---|---|
| JP | 4-70053 | 9/1992 |
| JP | 5-50338 B | 7/1993 |
| JP | H06-114272 A | 4/1994 |
| JP | 7-101772 | 4/1995 |
| JP | A-7-133713 | 5/1995 |
| JP | 7-196363 | 8/1995 |
| JP | H07-242465 A | 9/1995 |
| JP | 8-257407 | 10/1996 |
| JP | 9-117674 | 5/1997 |
| JP | 57-78946 | 5/1997 |
| JP | 09-155189 | 6/1997 |
| JP | 09-158710 | 6/1997 |
| JP | WO-9732817 A1 * | 9/1997 |
| JP | 2000-15112 A | 1/2000 |
| JP | 2000-17442 A | 1/2000 |
| JP | 2001-519310 A | 10/2001 |
| JP | 2002-28490 | 1/2002 |
| JP | 2002-66337 | 3/2002 |
| JP | 2002-119809 | 4/2002 |
| JP | 2002-513670 | 5/2002 |
| WO | WO 99/18047 | 4/1999 |
| WO | WO 99/28269 | 6/1999 |
| WO | WO 99/56872 | 11/1999 |
| WO | WO 00/40521 | 7/2000 |
| WO | WO 00/76939 A1 | 12/2000 |

OTHER PUBLICATIONS

Doi, Haruo, "Catalyst Support," Ceramics, vol. 17, No. 1 (1982), pp. 25-29 (partial translation), no month.

Udagawa et al., "Thermal Expansion of Ring Silicates," J. of the Materials Science of Japan, vol. 10 (1973), pp. 214-220 (partial translation), no month.

"Evaluation Methods for Ceramics," (Mar. 31, 1997) (partial translation).

Iwanami's Rikagaku Jiten (Physics and Chemistry Dictionary), Ver. 5, (1998), p. 451 (partial translation), no month.

Nippon Ceramic Association, "Ceramics Engineering Handbook," Gihodo Shuppan K.K., (Apr. 10, 1989), pp. 33-36 (partial translation enclosed).

Fine Ceramics Dictionary Edition Committee, "Fine Ceramics Dictionary," Gihodo Shuppan K.K. (1987), p. 183 (partial translation enclosed).

Japanese Application No. 2000-104994 (corresponding to U.S. Appl. No. 09/546,227), Official Action mailed Jun. 20, 2006 (translation enclosed).

* cited by examiner

Figure
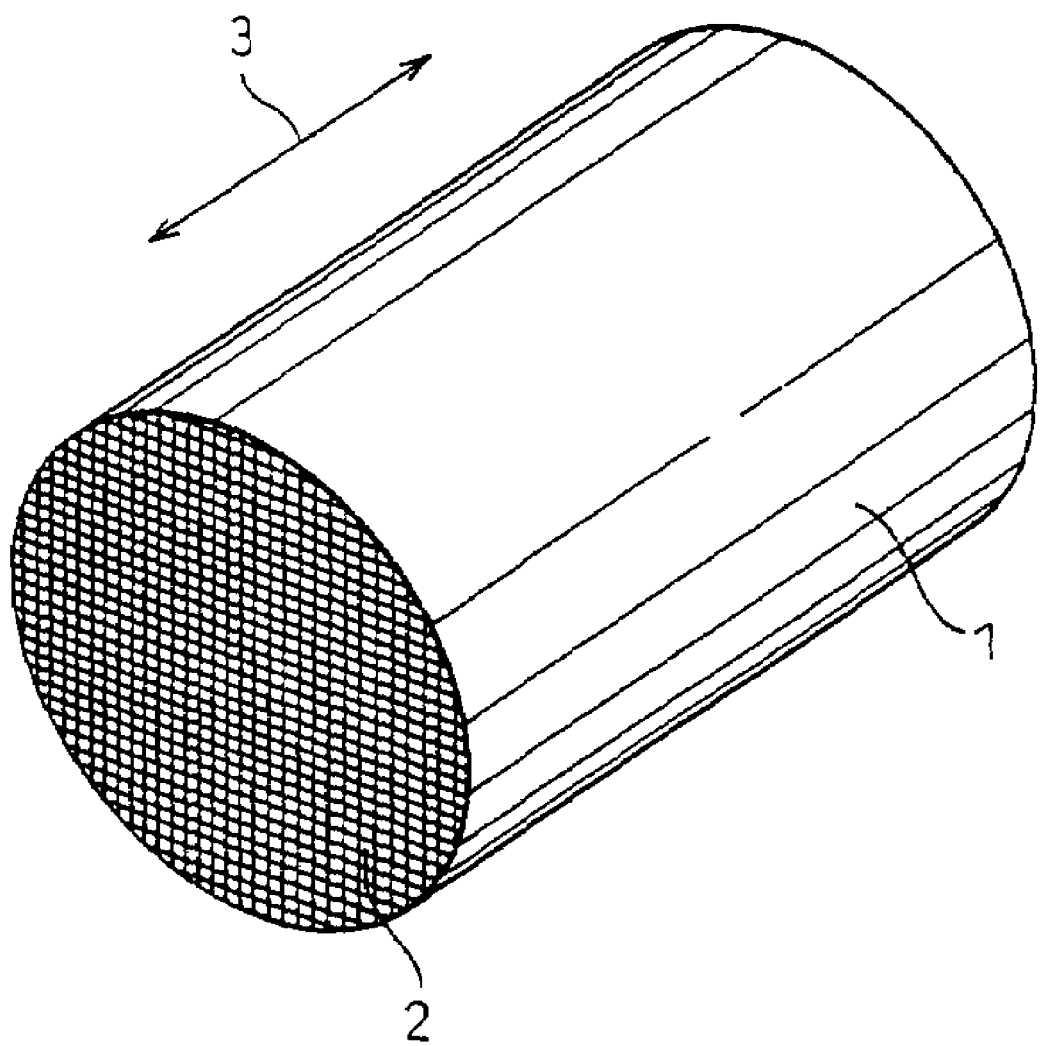

CERAMIC SUPPORT CAPABLE OF SUPPORTING A CATALYST, A CATALYST-CERAMIC BODY AND PROCESSES FOR PRODUCING SAME

BACKGROUND OF THE INVENTION

1. Field of the Invention

The present invention relates to a ceramic support for supporting a catalyst component for cleaning an exhaust gas from an internal combustion engine of an automobile, etc., a catalyst-ceramic body using the ceramic support, and processes for producing these 2. Description of the Related Art A widely used conventional catalyst support for a catalyst component used to clean an exhaust gas is a honeycomb structure of cordierite, which is excellent in thermal shock resistance, the surface of which is coated with γ-alumina. This is because a cordierite honeycomb structure has a relatively small specific surface area such that a sufficient amount of a catalyst component cannot be supported thereon. Therefore, γ-alumina having a large specific surface area is coated on the surface of a cordierite honeycomb structure, to support a catalyst component such as Pt thereon.

Because recent changes in the exhaust gas regulation, a quick activation of a catalyst is required to reduce hydrocarbons from an exhaust gas generated immediately after the starting of an engine. To satisfy to this requirement, a reduction of the thermal capacity of a catalyst support, in order to increase the temperature elevating rate of a catalyst to an activated state has been considered. Reduction of the thermal capacity of a catalyst support can be made by decreasing the thickness of cell walls of a cordierite honeycomb structure. However, even if the thickness of cell walls of a cordierite honeycomb structure is reduced, to have a small thermal capacity, the amount of a coating of γ-alumina does not decrease, resulting in lowering the effect of reducing the thermal capacity of the honeycomb structure as a whole.

In reducing the thickness of cell walls of a cordierite honeycomb structure, a reduction in pressure loss can be expected but this effect is also reduced by a coating of γ-alumina. Further, although a cordierite honeycomb structure itself has a small thermal expansion coefficient, about $0.5 \times 10^{-6}/°$ C., the thermal expansion coefficient of a honeycomb structure with a coating of γ-alumina increases to about $1.5 \times 10^{-6}/°$ C., by which the thermal shock resistance of the honeycomb structure significantly decreases.

In order to solve the above problems, an increase in the specific surface area of a cordierite honeycomb structure to eliminate the necessity of a coating of γ-alumina has been considered. For example, Japanese Examined Patent Publication (Kokoku) No. 5-50338 discloses a method of carrying out acid and heat treatments of a cordierite honeycomb structure to increase the specific surface area thereof. Although it is mentioned that this method allows increase in the specific surface area from 1 $m^2$/g to about 30 $m^2$/g, this method disadvantageously decreases the strength of the cordierite honeycomb structure. Since the acid treatment selectively dissolves MgO and $Al_2O_3$ from the cordierite to increase the surface area, the crystal lattice of cordierite itself is destroyed and the strength of the cordierite honeycomb structure decreases.

A honeycomb structure should have a compressive strength in the direction of the flow channel as a high as 10 MPa or more to be installed in an exhaust gas cleaning catalyst converter. In the method disclosed in JPP'338, a compressive strength, in the direction of the flow channel, of 10 MPa or more cannot be attained if the treated cordierite honeycomb structure has a cell wall thickness of less than 150 μm at a cell density of 400 cpsi (cells per square inch). However, a cordierite honeycomb structure having a cell wall thickness of 150 μm at a cell density of 400 cpsi has a thermal capacity equivalent to that of a cordierite honeycomb structure having a cell wall thickness of 120 μm at a cell density of 400 cpsi and coated with γ-alumina at 180 g/l. Therefore, the above method in JPP'338 does not provide an improved effect in reducing the thermal capacity of a catalyst support, considering the fact that a cordierite honeycomb structure having a cell wall thickness of 85 μm at a cell density of 400 cpsi can be produced at present.

It is therefore required that a cordierite honeycomb structure for cleaning an exhaust gas has a compressive strength in the direction of the flow channel of 10 MPa or more with a cell wall thickness of 120 μm or less at a cell density of 400 cpsi and can support a required amount of a catalyst component without a coating of γ-alumina.

Thus, the object of the present invention is to make a ceramic support itself which can support a required amount of a catalyst component, by which the necessity of coating with γ-alumina is eliminated, and to thereby provide a ceramic support to be used to support a catalyst component for cleaning an exhaust gas from an internal combustion engine of an automobile, etc., which has a reduced thermal capacity and pressure loss as well as a lower thermal expansion coefficient. Also, the object of the present invention is to provide a catalyst-ceramic body and processes for producing the ceramic support and the catalyst-ceramic body.

SUMMARY OF THE INVENTION

The present inventors considered the conditions for fine pores necessary to directly support a catalyst component on a ceramic support and found that fine pores formed by defects such as oxygen vacancies and lattice defects in the ceramic crystals, by fine cracks formed on the surface of a ceramic support or body, and by vacancies of elements constituting the ceramic, etc. can make a ceramic support to support a required amount of a catalyst component without a coating of γ-alumina. It was also found that it is desired that the number of the above fine pores is $1 \times 10^{11}$/l or more, more preferably $1 \times 10^{16}$/l, further preferably $1 \times 10^{17}$/l or more. These fine pores may be present alone or in combination.

The ceramic support of the present invention is preferably a cordierite honeycomb structure comprising cordierite, the theoretical composition of which is $2MgO \cdot 2Al_2O_3 \cdot 5SiO_2$, as the main component and having a honeycomb shape. Since the diameter of an ion of a catalyst component is usually in the order of about 0.1 nm, a cordierite honeycomb structure preferably has a diameter or width of the fine pores formed on the surface which is up to 1000 times, preferably 1 to 1000 times the above ion diameter or about 0.1 nm, that is, 0.1 to 100 nm, and a depth of the fine pores which is not smaller than a half of the diameter of an ion of a catalyst component, that is, 0.05 nm or more. By having the above predetermined number of such fine pores, the ceramic support of the present invention can directly support a required amount of a catalyst component with a required strength being maintained.

When the ceramic support has the fine pores of oxygen vacancies or lattice defects, the number of the fine pores significantly depends on the amount of the oxygen in the cordierite honeycomb structure. To have the above stated number of the fine pores, it is suggested that the content of the oxygen in the cordierite honeycomb structure is made less than 47% by weight or more than 48% by weight. Also, it is suggested that the lattice constant of the $b_0$ axis of the cordierite crystal is made larger than 16.99 or smaller than 16.99. Specifically, the cordierite honeycomb structure preferably includes cordierite crystals having one or more in number of at least one of the oxygen vacancy and lattice defects in the unit lattice of cordierite crystal (also called as the unit cell of cordierite crystal), in an amount of not less than $4\times10^{-8}\%$ of said ceramic, more preferably not less than $4\times10^{-5}\%$ of said ceramic; or preferably has cordierite crystals which comprise not less than $4\times10^{-8}$, more preferably not less than $4\times10^{-7}$, of at least one of oxygen vacancy and lattice defect per the unit lattice of cordierite crystal, to make the number of the fine pores of the ceramic support $1\times10^{16}/l$ or more, preferably $1\times10^{17}/l$ or more.

A catalyst component is usually supported on a ceramic support by immersing a ceramic support in a solution of catalyst component ions in a solvent. A conventional cordierite honeycomb structure coated with γ-alumina has a typical size of fine pores of γ-alumina of about 2 nm, while the catalyst metal particles typically have a particle size of about 5 nm, larger than the size of the fine pores of γ-alumina. Therefore, it is considered that the fine pores of γ-alumina are necessary to support catalyst component ions, rather than to support metal particles. Thus, if a ceramic support has fine pores with a diameter or width equivalent to or larger than the diameter of catalyst component ions, that is, fine pores with a diameter or width of 0.1 nm or more, it is possible to support catalyst component ions. However, the size of the fine pore of the ceramic support should be not larger than 1000 times the diameter of catalyst component ions, in order to have a sufficient strength of the honeycomb structure. This size is 100 nm or smaller when the diameter of catalyst component ions is 0.1 nm. It is sufficient for supporting catalyst component ions that the depth of the fine pores be a half or more than the diameter of catalyst component ions.

Since the fine pores of defects or cracks are very fine and the surface area of a ceramic support having them cannot be measured by the usual measuring methods, the present invention designates or states the number of fine pores necessary to support a predetermined amount of a catalyst component. The amount of a catalyst metal supported in a presently used three way catalyst is about 1.5 g per liter of the volume of the honeycomb structure. The diameter of the catalyst metal particles should be about 1000 nm or smaller, preferably about 20 nm or smaller to exhibit the exhaust gas cleaning capability. If it is assumed that the weight of a catalyst metal supported by a honeycomb structure with a volume of 1 liter is W grams and all the catalyst metal particles are spheres with a diameter of r cm, the number N of the catalyst metal particles supported can be expressed by the following formula (1), in which ρ stands for the density of the catalyst metal in g/cm$^3$:

$$N\times(4/3)\pi r^3 \times \rho = W \quad (1)$$

In the case that Pt, which is the catalyst metal used in a presently used three way catalyst-ceramic body for cleaning, is supported at 1.5 g/l and all the Pt particles have a diameter of 1000 nm, the number of the Pt particles supported is $1.34\times10^{11}/l$ from the above formula (1), in which the density of Pt is 21.45 g/cm$^3$. Since each catalyst metal particle requires about one fine pore for supporting, the number of the fine pores necessary to support a required amount of the catalyst metal particles directly on a ceramic support is at least $1\times10^{11}/l$ or more. When the average diameter of the catalyst metal particles becomes about 10 nm, the cleaning capability can be about equal to that of a presently used three way catalyst. At that time, the number of the catalyst metal particles is $1.34\times10^{17}/l$ from the above formula (1) and, therefore, the number of necessary fine pores is preferably $1\times10^{17}/l$ or more.

On the other hand, the weight of a cordierite honeycomb structure having a cell wall thickness of 100 μm at a cell density of 400 cpsi is about 230 g/l. If all the honeycomb structure is made of cordierite $Mg_2Al_4Si_5O_{18}$, the number of the unit lattices of cordierite crystal (i.e., the number of the unit cells of cordierite crystal, equal to the number of cordierite molecules) can be calculated by the following formula (2):

(number of unit lattices of cordierite)

=(weight of honeycomb)/(molecular weight of cordierite)×(Avogadro number)

=((230 g/l)/584.95 g)×6×10$^{23}$

=2.36×10$^{23}$/l  (2)

If it is assumed that a cordierite honeycomb structure has $1\times10^{16}/l$ of oxygen vacancies or lattice defects and only one such defect of oxygen vacancy or lattice defect is formed in one cordierite crystal unit lattice, the percent ratio of cordierite unit lattices having a defect in relation to the cordierite crystal as a whole can be calculated by the following formula (3):

(percent ratio of cordierite unit lattices having a defect)

=(number of defects)/(number of unit lattices of cordierite)

=(1×10$^{16}$/2.36×10$^{23}$)×100%

=4×10$^{-8}$×100%=

=4×10$^{-6}$%

Also, if the number of defects is $1\times10^{17}$, the percent ratio of cordierite unit lattices of having a defect to all the cordierite crystals becomes $4\times10^{-5}\%$.

The number of defects such as oxygen vacancies or lattice defects can be also calculated by the formula: (number of defects)/(number of cordierite crystals), similar to the formula (3). That is, if the number of defects is $1\times10^{16}/l$, the number of defect per unit crystal lattice is $4\times10^{-8}$. If the number of defects is $1\times10^{17}/l$, the number of defects per unit crystal lattice is $4\times10^{-7}$.

In accordance with the present invention, the catalyst supporting capability is provided to a cordierite honeycomb structure by methods including (1) a method of forming an oxygen vacancy, or a lattice defect such as a metal vacant point and a lattice strain in a cordierite crystal unit lattice, (2) a method of forming a large number of fine cracks in at least one of the amorphous and the crystal phases, (3) a method of dissolving cordierite constituting elements or impurities in a liquid phase method to form vacancies or pores, (4) a method of chemically or physically forming vacancies or pores in a vapor phase method, and (5) a method of incorporating an oxygen storage substance. In the present invention, a cordierite honeycomb structure which has a predetermined number of the fine pores formed as above can directly support a catalyst component. Also, since these fine pores formed by the methods as above do not cause damage to the ceramic crystal lattice as in the prior art method, the cordierite honeycomb structure can have a compressive strength in the direction of the flow channel of 10 MPa or more and a thermal expansion coefficient of $1\times10^{-6}$° C. or less even if the thickness of the cell wall is reduced.

The cordierite honeycomb structures provided with a catalyst supporting capability by the above methods are described below.

First, a cordierite honeycomb structure, in which the cordierite crystal thereof has an oxygen vacancy or a lattice defect such as a metal vacancy or lattice strain, is described. The defect which makes catalyst component supporting possible, includes an oxygen vacancy or lattice defect. The oxygen vacancy is a defect formed when oxygen is in an amount insufficient to compose a cordierite crystal lattice, and a catalyst component can be supported on a pore which is formed where the oxygen is lacked. In order to support a required amount of a catalyst component, it is suggested that the content of oxygen in a honeycomb structure is made to be less than 47% by weight.

The lattice defect is a defect formed when oxygen is incorporated in an amount excess to compose a cordierite crystal lattice, and a catalyst component can be supported on a pore which is formed by a strain of crystal lattice or a metal vacant point. In order to support a required amount of a catalyst component, it is suggested that the content of oxygen in a honeycomb structure is made to be more than 48% by weight.

A cordierite honeycomb structure having a defect in the crystal lattice can be produced by controlling the atmosphere for firing the honeycomb structure or by using particular cordierite materials. Among them, the oxygen vacancy can be formed (i) by controlling the firing atmosphere to a reduced pressure atmosphere or a reducing atmosphere, (ii) by using a compound not containing oxygen in at least part of the cordierite materials and firing the cordierite materials in a low oxygen concentration atmosphere, and (iii) by replacing some of at least one other-than-oxygen element constituting the cordierite by an element having a valency smaller than the replaced element. The lattice defect can be formed (iv) by replacing some of at least one element other than oxygen constituting the cordierite by an element having a valency larger than the replaced element. These methods (i) to (iv) are described in the following.

In the method (i) of forming a cordierite honeycomb structure having oxygen vacancies, the cordierite materials may be those generally used for producing cordierite, for example, talc ($Mg_3Si_4O_{10}(OH)_2$), kaolin ($Al_2Si_2O_{10}(OH)_4$), calcined kaolin, alumina ($Al_2O_3$), aluminum hydroxide ($Al(OH)_3$), etc. In addition to the above, oxides, hydroxides and the like which contain at least one of Si, Al and Mg elements constituting cordierite may be used as an Si source, an Al source and a Mg source.

The above cordierite materials are formulated as to form a theoretical composition as described before, and combined with a shaping agent such as a binder, a lubricant and a humidity-keeping agent as well as water, which is then extruded to form a honeycomb shape. The shaped body is heated in air at about 500° C. to remove an organic binder, followed by firing in a reduced pressure or reducing atmosphere to form a honeycomb structure. In firing in a reduced pressure atmosphere, the pressure is preferably about 4000 Pa (30 Torr) or less and the firing is typically carried out at about 1350° C. or higher for 2 hours or more.

As firing in a reduced pressure atmosphere, the oxygen contained in the cordierite materials leaves as a gas during the firing so that the oxygen becomes insufficient to compose cordierite and an oxygen vacancy in the cordierite crystal unit is formed. When firing in a reducing atmosphere, that is, when the firing is carried out under the conditions similar to the above but in a reducing atmosphere such as a hydrogen atmosphere, the oxygen contained in the cordierite materials reacts with the reducing gas to leave as a gas during the firing. As a result, the oxygen becomes insufficient to compose cordierite and an oxygen vacancy in the cordierite crystal unit is formed. When the cordierite materials used are oxides only, the oxygen composing cordierite can be completely supplied from the cordierite materials and, therefore, a reduced pressure atmosphere or a reducing atmosphere should be used to decrease the oxygen.

In the method (ii) of forming a cordierite honeycomb structure having oxygen vacancies, at least some Si, Al and Mg sources as the cordierite materials are replaced by a compound containing at least one of Si, Al and Mg and not containing oxygen. Such compounds may be nitrides, halogenides such as fluorides and chlorides, and the like, which contain at least one of Si, Al and Mg elements constituting cordierite. Some or all of at least one of Si, Al and Mg sources are replaced by the above compounds which do not contain oxygen. The other cordierite materials may be the same as those used in the method (i).

The above cordierite materials are formulated as to form a theoretical composition as described before and are formed into a honeycomb shape and heated to remove an organic binder, in the manner similar to the method (1), followed by firing in a low oxygen concentration atmosphere. The oxygen concentration of the atmosphere is from 0% to less than 3%, preferably from 0% to 1%. In this process, an oxygen vacancy is formed in the cordierite crystal lattice. When a compound not containing oxygen is used in the cordierite materials, the oxygen contained in the cordierite materials is insufficient to compose cordierite and the firing atmosphere does not provide a sufficient amount of oxygen to form a cordierite crystal by reaction since the concentration of oxygen in the firing atmosphere is low. Thus, an oxygen vacancy is formed in a cordierite crystal lattice.

When a compound not containing oxygen is used in the cordierite materials, a reduced pressure atmosphere or a reducing atmosphere, as used in the method (i), may be used in place of the low oxygen concentration atmosphere. In such a case, a sufficient amount of oxygen is not supplied to compose a cordierite crystal during the reaction process and an oxygen vacancy is formed in the cordierite crystal lattice.

In the method (iii), at least one other-than-oxygen element constituting cordierite is replaced by an element having a valency smaller than the replaced element to form oxygen vacancies. In this method, the cordierite materials in which some Si, Al and Mg sources are replaced by a compound containing an element having a valency smaller than that of the replaced Si, Al or Mg are used. The cordierite constituting elements, Si, Al and Mg, have valences of +4 (Si), +3 (Al) and +2 (Mg), respectively. Some of at least one of these elements may be replaced by a compound having a valency smaller than the replaced element. Such compounds may be any of oxides, hydroxides, nitrides, halogenides and the like and the other cordierite materials may be usual cordierite materials to prepare the cordierite materials. The prepared cordierite materials are formed into a honeycomb shape, heated to remove the organic binder, and then fired. The firing atmosphere may be any of a reduced pressure atmosphere, a reducing atmosphere, an oxygen-containing atmosphere such as an air atmosphere, or an atmosphere not containing oxygen. Since the oxygen necessary to compose cordierite is contained in the cordierite materials and the oxygen vacancies are formed by element replacement, the oxygen concentration in the firing atmosphere does not affect the product and any oxygen concentration in a range of 0 to 100% results in forming oxygen vacancies.

The cordierite constituting elements Si, Al and Mg have positive charges of +4 (Si), +3 (Al) and +2 (Mg). When any of the constituting elements is replaced by an element having a valency smaller than the replaced element, a positive charge corresponding to the difference of the replacing element with the replaced element is deficient and, in order to maintain the electrical neutrality, the negatively charged oxygen ($O^{2-}$) is released. Thus, by replacing the cordierite-constituting element by an element having a smaller valency, an oxygen vacancy can be formed in the cordierite crystal unit.

In the method (iv), at least one other-than-oxygen element constituting cordierite is replaced by an element having a valency larger than the replaced element to form lattice defects. In this method, the cordierite materials in which some of Si, Al and Mg sources is replaced by a compound containing an element having a valency larger than that of the replaced Si, Al or Mg are used. Also, in this case, some of at least one of the cordierite-constituting elements may be replaced by a compound having a valency larger than the replaced element and the other cordierite materials may be usual cordierite materials to prepare the cordierite materials. The prepared cordierite materials are formed into a honeycomb shape, heated to remove the organic binder, and then fired. The firing atmosphere in the method (iv) should be an atmosphere which supplies a sufficient amount of oxygen, such as in air. When an air atmosphere is used as the firing atmosphere, the heating step for removing an organic binder may be eliminated since an organic binder can be removed during the firing.

When any of the constituting elements is replaced by an element having a valency larger than the replaced element, a positive charge corresponding to the difference of the replacing element with the replaced element is in excess and, in order to maintain the electrical neutrality, the negatively charged oxygen ($O^{2-}$) is incorporated in a necessary amount. The incorporated oxygen impedes arrangement of the cordierite crystal lattice in the regular manner, so that lattice defects are formed.

When an oxygen vacancy is formed in the unit lattice of cordierite crystal, the amount of oxygen contained in the unit lattice of cordierite crystal becomes less than in the unit lattice of cordierite crystal without an oxygen vacancy. Also, the crystal lattice is deformed as the oxygen vacant portion is compressed, by which the lattice constant of $b_0$ axis of the cordierite crystal becomes smaller. On the other hand, when a lattice defect is formed in the unit lattice of cordierite crystal, the amount of oxygen contained in the unit lattice of cordierite crystal having such a lattice defect becomes more than in the unit lattice of cordierite crystal having no oxygen vacancy, and the lattice constant of $b_0$ axis of the cordierite crystal is changed. More specifically, when an oxygen vacancy is formed and the content of oxygen in the honeycomb structure becomes less than 47% by weight, the amount of oxygen contained in the unit cordierite crystal lattice becomes less than 17.2 and the lattice constant of $b_0$ axis of the cordierite crystal becomes smaller than 16.99. Also, when lattice defect is formed and the content of oxygen in the honeycomb structure becomes more than 48% by weight, the amount of oxygen contained in the unit lattice of cordierite crystal becomes more than 17.6 and the lattice constant of $b_0$ axis of the cordierite crystal becomes larger than 16.99.

As described above, in the present invention, due to oxygen vacancies or lattice defects formed in the cordierite crystal lattice, a required amount of a catalyst component can be supported on a cordierite honeycomb structure. Here, since the size of the defects are considered to be in the order of several angstroms or less, the specific surface area cannot be measured by usual specific surface area measuring methods such as the BET method using nitrogen atoms.

Next, a cordierite honeycomb structure having a large number of fine cracks in at least one of the amorphous and the crystal phase in the above method (2) is described. The fine cracks are formed by (i) applying thermal shock or (ii) applying a shock wave, to a cordierite honeycomb structure, by which the fine cracks are formed in at least one of the amorphous and the crystal phase and the cordierite honeycomb structure is enabled to support a catalyst component. The fine cracks should have a width equivalent to or larger than the ion diameter of catalyst component, usually 0.1 nm or more, and a depth of a half or more of the ion diameter of catalyst component, usually 0.05 nm or more, to support the catalyst component. In order to maintain the strength of the honeycomb structure, smaller cracks are preferred, usually the width thereof being about 100 nm or less, more preferably about 10 nm or less.

The method (i) of applying thermal shock is performed by heating a cordierite honeycomb structure followed by rapid cooling. The application of thermal shock is carried out after a cordierite crystal phase and an amorphous phase. The application of thermal shock may be performed, either, by preparing cordierite materials, forming the cordierite materials into a shape, heating the shape to remove an organic binder and then firing the shape to form a cordierite honeycomb structure, as usual, followed by re-heating the cordierite honeycomb structure to a predetermined temperature and then rapidly cooling the heated cordierite honeycomb structure; or by rapidly cooling the cordierite honeycomb structure produced in the usual manner, during the cooling step following the firing step. Formation of fine cracks usually occurs if the temperature difference between before and after the rapid cooling (thermal shock temperature difference) is about 80° or more and the size of the cracks increases along with an increase in the thermal shock temperature difference. However, the thermal shock temperature difference is preferably not higher than about 900° C. since, if the size of the cracks is too large, it is difficult to maintain the shape of the honeycomb structure.

In a cordierite honeycomb structure, the amorphous phase is present in the form of layers around the crystal phase. If thermal shock is applied to a cordierite honeycomb structure by rapid cooling after heating the honeycomb structure, a thermal stress corresponding to a thermal shock temperature difference and a thermal expansion coefficient difference between the amorphous and crystal phases occurs near the interface between the amorphous and crystal phases. If the amorphous or crystal phase cannot endure the thermal shock, fine cracks appear. The amount of the fine cracks can be controlled by the amount of the amorphous phase present in the cordierite honeycomb structure. Since the fine cracks are formed near the amorphous phase, the amount of the fine cracks increases if the amount of the amorphous phase increases.

The amorphous phase in a cordierite honeycomb structure is considered to be formed by an alkali metal element or an alkaline earth metal element, which is contained in a small amount in the cordierite materials, which functions as a flux during the firing of the honeycomb structure. Therefore, the amount of fine cracks to be formed by thermal shock can be increased by adding an alkali metal element or an alkaline earth metal element to increase the amount of the amorphous phase. Further, by controlling the amount of the added alkali metal element or alkaline earth metal element, the amount of the fine cracks can be controlled. The effect of addition of an alkali metal element or alkaline earth metal element can be obtained when the alkali metal element or alkaline earth metal element is added in an amount of more than such an amount of the alkali metal elements and alkaline earth metal elements as impurities contained the cordierite materials, and, usually, more than 0.05% by weight of the total of the alkali metal element and alkaline earth metal element is sufficient. Such an alkali metal element or alkaline earth metal element may be added as a compound containing an alkali metal element or alkaline earth metal element, for example, as an oxide, hydroxide, carbonate, etc. thereof in the step of preparing the cordierite materials.

In place of the thermal shock, the method (ii) of applying a shock wave may be used to introduce fine cracks in an amorphous or crystal phase. In this case, when the energy of the shock wave exceeds the strength of weak portions of a honeycomb structure, fine cracks are formed. The means for providing a shock wave include ultrasound wave, vibration, etc. and the amount of the formed fine cracks can be controlled by the energy, etc. of the shock wave.

It is possible that fine cracks may be additionally formed to at least one of amorphous and crystal phases of a cordierite honeycomb structure by the method (2), in which oxygen vacancies or lattice defects have been formed in cordierite crystal lattice by the method (1). In this case, after a cordierite honeycomb structure having oxygen vacancies or lattice defects and having an oxygen content of less than 47% by weight or more than 48% by weight and a lattice constant of crystal axis $b_0$ of larger or smaller than 16.99 is formed by firing in the method (1), a thermal shock or shock wave is applied to the honeycomb structure by the method (2) to obtain a cordierite honeycomb structure having at least ones of oxygen vacancies or lattice defects as well as a large number of fine cracks. To support a required amount of a catalyst component, it is sufficient to have a total number of the oxygen vacancies, lattice defects and fine cracks of $1 \times 10^7/l$ or more, preferably $1 \times 10^8/l$ or more. The application of a shock wave of method (2) can induce fine cracks in amorphous and/or crystal phases.

Next, the method (3), a liquid phase process, of dissolving constituting elements or impurities of cordierite to form vacancies in a cordierite honeycomb structure, is now described. The vacancies are formed by dissolving a metal element such as Mg or Al in the cordierite crystal, an alkali metal element or alkaline earth metal element contained in the amorphous phase, or an amorphous phase itself, into a high temperature and high pressure water, a super critical fluid, an alkali solution or the like. A catalyst component can be supported on the fine pores formed by the above vacancies of elements, etc.

A cordierite honeycomb structure is first formed by a usual process, i.e., by preparing cordierite materials containing Si, Al and Mg sources, forming the cordierite materials into a shape, heating the shape to remove an organic binder, and firing the shape. The thus produced cordierite honeycomb structure is then immersed in a high temperature and high pressure water, a super critical fluid or an alkali solution. As a result, metal elements such as Mg or Al in the cordierite crystal, alkali metal element and alkaline earth metal elements contained in the amorphous phase, or the amorphous phase itself are dissolved to form fine pores. The size of the fine pores can be controlled by the temperature of the solution, the pressure, the solvent, etc. Specifically, high temperature and high pressure water, at 10 MPa and 300° C., a super critical fluid of $CO_2$ or the like, and a solution such as an alkali solution, for example, sodium hydroxide, are used. By adding an alkali metal element or an alkaline earth metal element to cordierite materials, it is possible to form an amorphous phase, by which the amount of the fine pores can be also controlled.

The method (4), a vapor phase method, of chemically or physically forming vacancies in a cordierite honeycomb structure is described. Fine pores are formed by dry etching or sputter etching a cordierite honeycomb structure. In the dry etching, a reaction gas is excited by discharging the reaction gas by radio frequency energy others. The reaction gas reacts with Si, Al and/or Mg of the cordierite-constituting elements to form volatile substances, which are volatilized and evacuated, by which the cordierite is etched. The thus chemically etched vacancies constitute fine pores on which a catalyst component can be supported. The reaction gas may be $CF_4$, etc., which reacts with the cordierite-constituting elements to form volatile substances such as $Si_4F$, etc. The level of the dry etching can be controlled by the etching time period, the kind of the reaction gas, the supplied energy, etc.

In the sputter etching, a cordierite honeycomb structure is placed in a plasma of Ar, etc., which is excited by radio frequency wave, etc., by which the Ar ions, etc. bomb the surface of the cordierite to sputter atoms or masses of pluralities of atoms of the cordierite-constituting elements, thus sputter etching the cordierite. The thus physically etched vacancies constitute fine pores where a catalyst component can be supported. The level of the sputter etching can be controlled by the etching time period, the kind of the excited gas, the supplied energy, etc.

Next, the method (5) of incorporating an oxygen storage substance in a cordierite honeycomb structure is described. A substance capable of storing oxygen, for example, $CeO_2$, incorporates and releases oxygen in the reversible reaction represented by the following formula:

$$2CeO_2 \Leftrightarrow Ce_2O_3 + 1/2 O_2$$

in accordance with the change in the oxygen concentration in the atmosphere. That is, when the oxygen concentration in the atmosphere is high, the valence of Ce is +4, but when the oxygen concentration in the atmosphere is low, the valence of Ce becomes +3, by which, due to unbalanced electrical neutrality caused by the change in the valency, the oxygen storage substance releases or incorporates oxygen to maintain the electrical neutrality. Such an oxygen storage substance is used as a co-catalyst in a three way converter catalyst in which oxygen is incorporated and released depending on the change in the concentration of oxygen in an exhaust gas to control the air-to-fuel ratio to near the theoretical air-to-fuel ratio.

If cerium, Ce, which can take a plurality of valencies, is substituted for a cordierite-constituting element in a cordierite honeycomb structure, in order to complement the change of the valency, as in the method (1), an excess or deficiency of oxygen is caused to form an oxygen vacancy or lattice defect in the cordierite crystal lattice. The oxygen vacancy or lattice defect results in fine pores allowing catalyst support and providing the cordierite honeycomb structure with the oxygen storage capacity. That is, without a coating of γ-alumina, a catalyst component can be directly supported and, without separately supporting a co-catalyst, an oxygen storage capacity is provided. In order to provide the oxygen storage capacity, the content of $CeO_2$ in a cordierite honeycomb structure is desirably made in a range of 0.01% by weight or less.

In order to obtain a cordierite honeycomb structure containing $CeO_2$, Ce is substituted for some of at least one of Si, Al and Mg elements constituting the cordierite. The substitution may be in the same manner as in the method (1), and can be made by using cordierite materials in which a compound containing Ce in place of Si, Al or Mg is substituted for some of the Si, Al and Mg sources. Since Ce has a valence of +4 in air, if Ce is substituted for Mg (+2) or Al (+3) having a smaller valence, a lattice defect is formed as in the similar manner as in the above (iv), and even if Ce is substituted for Si (+4), an oxygen vacancy is formed since some of Ce has a valence of +3.

Thus, by using Ce as a substituting element, a cordierite honeycomb structure having a catalyst supporting capability and an oxygen storage capacity can be obtained. If $CeO_2$ is supported as a co-catalyst, $CeO_2$ may be thermally deteriorated and result in grain growth, lowering the oxygen storage capacity. However, if $CeO_2$ is incorporated in the cordierite structure, no grain growth occurs and the oxygen storage capacity is not deteriorated.

After the cordierite honeycomb structure is fired, a thermal shock or shock wave may be applied as in the above method (2) to form fine cracks. This increases the number of the fine pores improving the catalyst supporting capability. Alternatively, in combination with the method, elements other than Ce may be used, or the firing atmosphere may be controlled, to control the number of oxygen vacancies and lattice defects formed.

A co-catalyst having an oxygen storage capacity such as $CeO_2$ may be additionally supported on a cordierite honeycomb structure in which the catalyst supporting capability has been provided by the above methods (1) to (4). In this case, since the co-catalyst can be supported without coating γ-alumina and utilizing fine pores of the catalyst supporting capability, a cordierite honeycomb structure having a catalyst supporting capability and an oxygen storage capacity can be easily obtained. Supporting a co-catalyst having an oxygen storage capacity may be done by supporting a precursor of a co-catalyst such as an ion or a complex thereof followed by heat treatment.

The cordierite honeycomb structure having a catalyst supporting capability, as produced by the above methods, may be preferably used as a ceramic support used for a catalyst for cleaning an exhaust gas of an internal combustion gas. In this ceramic support, 0.1 g/l or more of a catalyst component can be supported on the fine pores of the cordierite honeycomb structure without a coating of γ-alumina, so that a catalyst-ceramic body having a low thermal capacity, a high thermal shock resistance and a low pressure loss can be obtained. The catalyst metal component may be at least one of metals having a catalyst activity and metal oxides having a catalyst activity. The metals having a catalyst activity include noble metals such as Pt, Pd and Ph and the metal oxides having a catalyst activity include oxides containing at least one metal of V, Nb, Ta, Cr, Mo, W, Mn, Fe, Co, Ni, Cu, Zn, Ga, Sn, Pb, etc.

The methods for supporting a catalyst component include the liquid phase methods, in which a catalyst component is dissolved in a solvent and impregnated into a cordierite honeycomb structure to support the catalyst component in the fine pores such as defects and cracks, and the vapor deposition methods such as CVD and PVD, as well as other methods including use of a super critical fluid. It is preferred to use a vapor phase deposition methods or a method using a solvent such as a super critical fluid which can be infiltrated into deep inside the fine pores, since the fine pores such as defects or cracks formed in the cordierite honeycomb structure are very fine. In the liquid phase methods, although water may be used as the solvent, a solvent having a smaller surface tension than water, for example, an alcohol solvent such as methanol is preferred. By using a solvent having a smaller surface tension than water, the solution can be sufficiently infiltrated into the fine pores. In this case, if the infiltration is performed while vibration is applied or vacuum defoaming is carried out, the solvent can be more easily introduced into the fine pores. Further, a catalyst component may be supported on a ceramic support by a plurality of supporting steps using the same or different compositions until a necessary amount of the catalyst component is supported. These methods may be effectively used to support a catalyst component in an amount of 0.5 g/l or more.

The catalyst-ceramic body of the present invention obtained by the above process is a catalyst-ceramic body excellent in cleaning performance, which supports a required amount of a catalyst component directly thereon with a narrow space therebetween, without a coating of γ-alumina. Specifically, a catalyst component may be supported until the content of the metal element in the catalyst-ceramic body supporting the catalyst component, becomes 0.01% by weight, and the average space between the catalyst component particles (particles of catalyst component ion and catalyst metal, etc.) supported on the catalyst-ceramic body is as small as 0.1 to 100 nm. This means that with the same supporting amount of a catalyst component, the particle size of the catalyst component particles become smaller and the number thereof larger, which results in a denser distribution of the catalyst component on the entire surface of the ceramic support and the catalyst exhibits its performance more effectively.

Moreover, in the present invention, a metal having a catalyst captivity may be substituted for a constitutional element of a cordierite honeycomb structure, to obtain a catalyst-ceramic body. In this case, cordierite materials in which some the Si, Al and Mg sources are replaced by a compound containing a metal having a catalyst activity, preferably a noble metal such as Pt, Pd or Rd, in place of Si, Al or Mg of the cordierite-constituting elements, are used. Such cordierite materials are formed into a shape, heated to remove an organic binder and then fired to form a ceramic catalyst body. The firing atmosphere may be a reducing pressure atmosphere having a pressure of 4000 Pa or less, a reducing atmosphere such as a hydrogen atmosphere, or an oxygen-containing or an oxygen-free atmosphere. If a metal having an oxygen storage capacity such as Ce is used also as a substituting metal, in addition to a metal having a catalyst activity, the catalyst-ceramic body can support a catalyst component as well as a co-catalyst having an oxygen storage capacity.

BRIEF DESCRIPTION OF THE DRAWING

The FIGURE shows a cordierite honeycomb structure wherein the reference numeral 1 denotes a cordierite honeycomb structure, 2 cells of flow channel, and 3 the direction of flow channel.

EXAMPLES

Example 1

In Example 1, as the cordierite materials, talc, kaolin, alumina and aluminium hydroxide were used and formulated into a near theoretical cordierite composition. The cordierite materials were added with appropriate amounts of a binder, a lubricant and a humidicant, kneaded to a clay-like material and extruded to form a honeycomb shape having a cell wall thickness of 100 µm, a cell density of 400 cpsi (cells per square inch) and a diameter of 50 mm. The honeycomb shape was dried by heating, in air, up to 800° C. to remove the binder, and then fired by reducing the pressure to $6.7 \times 10^{-4}$ Pa ($5 \times 10^{-6}$ Torr) and keeping the honeycomb shape under that pressure at 1390° C. for 2 hours, to obtain a honeycomb structure.

The obtained honeycomb structure was evaluated in the oxygen content of the honeycomb structure, the number of oxygen contained in the unit lattice of the cordierite crystal, the lattice constant of the $b_0$ axis of the cordierite crystal, the amount of Pt supported on the honeycomb structure (see below), the thermal expansion coefficient in the direction of the flow channel and the compressive strength in the direction of the flow channel. The results are shown in Table 1.

The oxygen content of the honeycomb structure was measured by a simultaneous oxygen and nitrogen analyser. The number of oxygen contained in the unit lattice of the cordierite crystal was calculated from the amount of oxygen contained in the honeycomb structure. The lattice constant of the $b_0$ axis of the cordierite crystal was obtained from the positions of diffraction peaks of (020) plane of the cordierite unit crystals by the powder X-ray diffraction, using the (112+) plane of $Mn_2O_3$ as the reference by adding $Mn_2O_3$ to the measured sample for correction of the positions of the diffraction peaks.

The amount of Pt supported on the honeycomb structure was measured using X-ray fluorescence spectroscopy by supporting a catalyst component on the honeycomb structure and pulverizing the honeycomb structure supporting the catalyst component. The supporting of Pt as the catalyst component was done by preparing a solution of chloroplatinic acid in water or ethanol in a concentration of 0.1 mol/l, immersing the honeycomb structure in the solution, drying, and firing or heating the immersed honeycomb structure in air at 800° C. for 2 hours.

The thermal expansion coefficient in the direction of the flow channel was measured using a pressing bar-type thermal expansion meter as the average thermal expansion coefficient from 25° C. to 800° C. The compressive strength in the direction of the flow channel was determined by cutting out a cylinder of the honeycomb structure with a diameter of 1 inch and a length of 1 inch and applying a load to the cylinder in the direction of the flow channel until the cylinder was broken, the pressure at breaking being used as the compressive strength.

For comparison, a cordierite honeycomb structure was produced in the same manner as above except that the honeycomb shape was fired in air at 1390° C. for 2 hours, which is Comparative Example 1. This cordierite honeycomb structure was evaluated similarly and the results are also shown in Table 1.

In comparison with Comparative Example 1, the cordierite honeycomb structure fired in a reduced pressure atmosphere had a reduced content of the honeycomb structure, a reduced amount of oxygen contained in the unit lattice of the cordierite crystal, and a smaller lattice constant of the $b_0$ axis of the cordierite crystal. It is clear that oxygen left the cordierite crystals and oxygen vacancies were formed.

With respect to the amount of the supported Pt, only a very small amount of Pt, too small to be detected, was supported on the cordierite honeycomb structure in both the cases where water and ethanol were used as the solvent in Comparative Example 1. In Example 1, in contrast, Pt was supported in an amount of 1.00 g/l in the case of water and 13.79 g/l in the case of ethanol. It is clearly shown that Pt can be supported in a sufficient amount on the honeycomb structure of Example 1. Further, the reason why the amount of the supported Pt is lower in the case of water as the solvent is because, with a solvent having such high surface tension as water, the Pt solution cannot come close to the oxygen, and vacancies and Pt ions are difficult to incorporate into the oxygen vacancies.

Further, in Example 1, the thermal expansion coefficient in the direction of the flow channel was $0.92 \times 10^{-6}$/° C., satisfying the requirement of not more than $1.0 \times 10^{-6}$/° C. required for a catalyst support, and the compressive strength in the direction of the flow channel was 11.92 MPa, exceeding the 10 MPa required for a honeycomb structure to endure a load for assembling into a catalyst converter.

The oxygen vacancies of the honeycomb structure of Example 1 were observed by Transmission Electron Microscopy (TEM). The size of the oxygen vacancies was about 0.4 nm. Since this size is about four times the diameter of the Pt ion, about 0.1 nm, these oxygen vacancies are sufficiently large to support Pt ions.

The amount of the oxygen vacancies of the honeycomb structure in Example 1 can be calculated as below. The amount of the oxygen vacancies of the honeycomb structure in Example 1 corresponds to the difference of the content of oxygen between the honeycomb structure produced in Comparative Example 1 and the honeycomb structure in Example 1. Since the above difference in the contents was 2.0% by weight, this corresponds to 0.7 oxygen contained in the unit lattice of the cordierite crystal. Since the number of the unit lattices of the cordierite crystal contained in the cordierite honeycomb structure is $2.36 \times 10^{23}$/l, the number of oxygen vacancies becomes $1.65 \times 10^{23}$/l by the following formula:

$$(2.36 \times 10^{23}/l) \times 0.7 = 1.65 \times 10^{23}/l$$

This number of oxygen vacancies far exceeds the number of fine pores required for a catalyst support, as mentioned before, i.e., $1 \times 10^{16}$/l, preferably $1 \times 10^{17}$/l.

In contrast, in Comparative Example 1, the cordierite honeycomb structure had a large number of cracks, so called microcracks, having a size of about several hundreds nanometers. However, the amount of Pt supported on the cordierite honeycomb structure in Comparative Example 1 was in such a small amount that the supported Pt was not detected, as mentioned above. It is considered that Pt was not supported on microcracks, since the width of the microcracks is about a few thousands times the diameter of Pt ion and is too large to support Pt therein in the supporting step.

TABLE 1

| Sample | Firing atmosphere | Oxygen content (wt %) | Number of oxygen | Lattice constant $b_0$ (Å) | Pt supported amount (g/L) | | Thermal expansion coefficient ($\times 10^{-6}$/° C.) | Compressive strength (MPa) | Remarks |
|---|---|---|---|---|---|---|---|---|---|
| | | | | | Aqueous solution | Ethanol solution | | | |
| Comparative Example 1 | Air atmosphere | 47.0 | 17.2 | 16.99 | 0 | 0 | 0.47 | 18.0 | |
| Example 1 | Reduced pressure atmosphere $6.7 \times 10^{-4}$ Pa | 45.0 | 16.5 | 16.96 | 1.0 | 13.8 | 0.92 | 11.9 | |
| Example 2 | Hydrogen atmosphere | 42.5 | 15.5 | 16.94 | 1.1 | 14.8 | 0.99 | 10.2 | |

Example 2

The same cordierite materials as in Example 1 was formed into a honeycomb shape, heated to remove a binder and then fired in a hydrogen atmosphere as a reducing atmosphere at 1390° C. for 2 hours.

The obtained honeycomb structure was evaluated in the same manner as in Example 1 and the results are also shown in Table 1.

It is clear from Table 1 that in comparison with Comparative Example 1, the cordierite honeycomb structure fired in a reducing atmosphere in Example 1 had a reduced content of the honeycomb structure, a reduced amount of oxygen contained in the unit lattice of the cordierite crystal, and a smaller lattice constant of the $b_0$ axis of the cordierite crystal. It is therefore clear that oxygen left the cordierite crystals and oxygen vacancies were formed. When Pt was supported on the cordierite honeycomb structure, the amount of the Pt supported was 1.14 g/l in the case of water used as the solvent and 14.81 g/l in the case of ethanol used as the solvent. The thermal expansion coefficient in the direction of the flow channel was $0.99 \times 10^{-6}$/° C., and the compressive strength in the direction of the flow channel was 10.2 MPa, both of which satisfy the requirements.

The amount of the oxygen vacancies of the honeycomb structure in Example 2 was also calculated. The amount of the oxygen vacancies of the honeycomb structure in Example 2 corresponds to the difference of the content of oxygen between the honeycomb structure produced in Comparative Example 1 and the honeycomb structure in Example 2. Since this difference of the content was 4.5% by weight, this corresponds to 1.7 oxygens contained in the unit lattice of the cordierite crystal. Since the number of the unit lattices of the cordierite crystal contained in the cordierite honeycomb structure is $2.36 \times 10^{23}$/l, the number of oxygen vacancies becomes $4.01 \times 10^{23}$/l by the following formula:

$$(2.36 \times 10^{23}/l) \times 1.7 = 4.01 \times 10^{23}/l$$

Thus, in accordance with the present invention, there is provided a cordierite honeycomb structure in which fine pores having a size suitable to support a catalyst component are formed in a sufficient number for supporting the catalyst component.

Examples 3 to 6 and Comparative Examples 2 to 7

In Example 3, $Si_3N_4$ was used for 10% by weight of the Si source and, talc, kaolin, alumina and aluminum hydroxide were used as the other Si, Al and Mg sources to formulate a near theoretical cordierite composition. The thus prepared cordierite materials were formed into a honeycomb shape, heated to remove a binder and then fired or heated at 1390° C. in an atmosphere having an oxygen concentration of 1% for 2 hours to produce a cordierite honeycomb structure.

In Example 4, $AlF_3$ was used for 10% by weight of the Al source and talc, kaolin, alumina and aluminum hydroxide were used as the other Si, Al and Mg sources to formulate a near theoretical cordierite composition. Using these cordierite materials, a cordierite honeycomb structure was produced in the same manner as above.

In Example 5, $MgCl_2$ was used for 10% by weight of the Mg source and talc, kaolin, alumina and aluminum hydroxide were used as the other Si, Al and Mg sources to formulate a near theoretical cordierite composition. Using these cordierite materials, a cordierite honeycomb structure was produced in the same manner as above.

The obtained cordierite honeycomb structures were evaluated in the same manner as in Example 1. The results are shown in Table 2.

For comparison, cordierite honeycomb shapes were made using the same cordierite materials as in Examples 3 to 5 and were fired in an atmosphere having an oxygen content of 3% or 12%. These were made as Comparative Examples 2 to 7. The obtained cordierite honeycomb structures were evaluated in the same manner as in Example 1. The results are shown in Table 2.

As seen in Table 2, in comparison with Comparative Examples 2 to 7, the cordierite honeycomb structures produced by firing in an atmosphere having an oxygen concentration of 1% in Examples 3 to 5 had a reduced oxygen content of the honeycomb structure, a reduced number of the oxygen contained in the unit lattice of the cordierite crystal, and a smaller lattice constant of the $b_0$ axis of the cordierite crystal. It is therefore clear that oxygen vacancies were formed.

When Pt was supported on the cordierite honeycomb structures of Examples 3 to 5, Pt was supported in an amount of 0.21 to 0.35 g/l in the case of water as the solvent and in an amount of 2.88 to 3.44 g/l in the case of ethanol. The thermal expansion coefficient in the direction of the flow channel was 0.89 to $0.94 \times 10^{-6}$/° C., and the compressive strength in the direction of the flow channel was 12.8 to 14.3 MPa, both of which satisfy the requirements.

TABLE 2

| Sample | Replacing cordierite material | Firing atmosphere | Oxygen content (wt %) | Number of oxygen | Lattice constant $b_0$ (Å) | Pt supported amount (g/L) Aqueous solution | Pt supported amount (g/L) Ethanol solution | Thermal expansion coefficient (×10⁻⁶/° C.) | Compressive strength (MPa) | Remarks |
|---|---|---|---|---|---|---|---|---|---|---|
| Example 3 | $Si_3N_4$ | Oxygen concentration: 1% | 46.0 | 16.8 | 16.98 | 0.35 | 3.04 | 0.89 | 13.3 | |
| Example 4 | $AlF_3$ | Oxygen concentration: 1% | 46.0 | 16.8 | 16.98 | 0.24 | 3.44 | 0.94 | 14.3 | |
| Example 5 | $MgCl_2$ | Oxygen concentration: 1% | 46.5 | 17.0 | 16.98 | 0.21 | 2.88 | 0.91 | 12.8 | |
| Comparative Example 2 | $Si_3N_4$ | Oxygen concentration: 3% | 47.5 | 17.4 | 16.99 | 0 | 0 | 0.39 | 17.9 | |
| Comparative Example 3 | $AlF_3$ | Oxygen concentration: 3% | 47.0 | 17.2 | 16.99 | 0 | 0 | 0.86 | 17.6 | |
| Comparative Example 4 | $MgCl_2$ | Oxygen concentration: 3% | 48.0 | 17.6 | 16.99 | 0 | 0 | 0.83 | 17.5 | |
| Comparative Example 5 | $Si_3N_4$ | Oxygen concentration: 12% | 47.0 | 17.2 | 16.99 | 0 | 0 | 0.32 | 18.1 | |
| Comparative Example 6 | $AlF_3$ | Oxygen concentration: 12% | 47.5 | 17.4 | 16.99 | 0 | 0 | 0.80 | 18.3 | |
| Comparative Example 7 | $MgCl_2$ | Oxygen concentration: 12% | 47.5 | 17.4 | 16.99 | 0 | 0 | 0.75 | 17.8 | |
| Example 6 | $Si_3N_4$ | Reduced pressure atmosphere $6.7 \times 10^{-4}$ Pa | 46.0 | 16.8 | 16.96 | 1.80 | 5.56 | 0.85 | 11.0 | |
| Example 7 | $AlF_3$ | Reduced pressure atmosphere $6.7 \times 10^{-4}$ Pa | 45.5 | 16.6 | 16.93 | 3.10 | 14.62 | 0.97 | 15.1 | |
| Example 8 | $MgCl_2$ | Reduced pressure atmosphere $6.7 \times 10^{-4}$ Pa | 46.5 | 17.0 | 16.96 | 1.03 | 7.94 | 0.97 | 12.2 | |
| Example 9 | $AlF_3$ | Hydrogen atmosphere | 43.0 | 15.7 | 16.94 | 1.01 | 12.14 | 0.96 | 10.9 | |
| Example 10 | $MgCl_2$ | Hydrogen atmosphere | 44.5 | 16.3 | 16.96 | 1.26 | 10.91 | 0.98 | 10.7 | |

Examples 6 to 10

In Examples 6 to 8, cordierite honeycomb structures were produced in the same manner as in Examples 3 to 5, except that the used firing atmosphere was a reduced pressure atmosphere having a pressure of 6.7 to $10^{-4}$ Pa ($5 \times 10^{-6}$ Torr).

In Examples 9 and 10, cordierite honeycomb structures were produced in the same manner as in Example 5, except that the used firing atmosphere was a hydrogen atmosphere as a reducing atmosphere.

The obtained cordierite honeycomb structures were evaluated in the same manner as in Example 1. The results are also shown in Table 2.

As seen in Table 2, in comparison with Comparative Examples 2 to 7, the cordierite honeycomb structures produced in Examples 6 to 10 had a reduced oxygen content of the honeycomb structure, a reduced number of the oxygen contained in the unit lattice of the cordierite crystal, and a smaller lattice constant of the $b_0$ axis of the cordierite crystal. It is therefore clear that oxygen vacancies were formed. When Pt was supported, Pt was supported in an amount of 1.01 to 3.10 g/l in the case of water as the solvent and in an amount of 5.56 to 14.62 g/l in the case of ethanol. The thermal expansion coefficient in the direction of the flow channel was 0.85 to 0.98×10⁻⁶/C, and the compressive strength in the direction of the flow channel was 10.7 to 15.1 MPa, both of which satisfy the requirements.

Examples 11 to 18

In Examples 11 and 12, $Fe_2O_3$ or $Ca_2O_3$ was used for 10% by weight of the Si source, and talc, kaolin, alumina and aluminum hydroxide were used as the other Si, Al and Mg sources to formulate a near theoretical cordierite composition. The thus prepared cordierite materials were formed into a honeycomb shape, heated to remove a binder and then fired at 1390° C. in an air atmosphere for 2 hours to produce a cordierite honeycomb structure.

The obtained cordierite honeycomb structures were evaluated in the same manner as before. The results are shown in Table 3.

In Examples 13 and 14, $GeO_2$ or $MoO_3$, as an oxide or an element having a valence larger than Al, was used for 10% by weight of the Al source, and talc, kaolin, alumina and aluminum hydroxide were used as the other Si, Al and Mg sources to formulate a near theoretical cordierite composition. The thus prepared cordierite materials were formed into a honeycomb shape, heated and then fired in the same manner as in Example 11.

In Examples 15 to 18, $Fe_2O_3$, $Ga_2O_3$, $GeO_2$ or $MoO_3$, as an oxide of an element having a valence larger than Mg, was used for 10% by weight of the Mg source, and talc, kaolin, alumina and aluminum hydroxide were used as the other Si, Al and Mg sources to formulate a near theoretical cordierite composition. The thus prepared cordierite materials were formed into a honeycomb shape, heated and then fired in the same manner as in Example 11.

The obtained cordierite honeycomb structures were evaluated in the same manner as before. The results are also shown in Table 3.

In Table 3, in comparison with Comparative Example 1, the cordierite honeycomb structures of Examples 11 and 12, in which some Si was replaced by an element having a smaller valence than Si, had a reduced oxygen content of the honeycomb structure, a reduced number of the oxygen contained in the unit lattice of the cordierite crystal, and a smaller lattice constant of the $b_0$ axis of the cordierite crystal. It is therefore clear that oxygen vacancies were formed. When Pt was supported, Pt was supported in an amount of 0.15 to 0.23 g/l in the case of water as the solvent and in an amount of 2.62 to 5.31 g/l in the case of ethanol. The thermal expansion coefficient in the direction of the flow channel was 0.86 to $0.89 \times 10^{-6}$/° C., and the compressive strength in the direction of the flow channel was 12.5 to 16.7 MPa, both of which satisfy the requirements.

In comparison with Comparative Example 1, the cordierite honeycomb structures of Examples 13 to 18, in which some cordierite-constituting element Al or Mg was replaced by an element having a larger valence than Al or Mg, had an increased oxygen content of the honeycomb structure, an increased number of the oxygen contained in the unit lattice of the cordierite crystal, and a varied lattice constant of the $b_0$ axis of the cordierite crystal. It is therefore clear that lattice defects were formed. When Pt was supported, Pt was supported in an amount of 0.27 to 1.24 g/l in the case of water as the solvent and in an amount of 0.67 to 3.69 g/l in the case of ethanol. The thermal expansion coefficient in the direction of the flow channel was 0.57 to $0.95 \times 10^{-6}$/° C., and the compressive strength in the direction of the flow channel was 10.8 to 14.8 MPa, both of which satisfy the requirements.

Examples 19 to 22

In Examples 19 and 20, cordierite honeycomb structures were produced in the same manner as in Examples 11 and 12, except that the used firing atmosphere was a reduced pressure atmosphere having a pressure of 6.7 to $10^{-4}$ Pa ($5 \times 10^{-6}$ Torr).

In Examples 21 and 22, cordierite honeycomb structures were produced in the same manner as in Examples 11 and 12, except that the used firing atmosphere was a hydrogen atmosphere as a reducing atmosphere.

The obtained cordierite honeycomb structures were evaluated in the same manner as in Example 1. The results are also shown in Table 3.

As seen in Table 3, in comparison with Comparative Example 1, the cordierite honeycomb structures produced in Examples 19 and 20 had a reduced oxygen content of the honeycomb structure, a reduced number of the oxygen contained in the unit lattice of the cordierite crystal, and a smaller lattice constant of the $b_0$ axis of the cordierite crystal. It is therefore clear that oxygen vacancies were formed. When Pt was supported, Pt was supported in an amount of 0.25 to 0.68 g/l in the case of water as the solvent and in an amount of 2.77 to 10.15 g/l in the case of ethanol. The thermal expansion coefficient in the direction of the flow channel was 0.91 to $0.98 \times 10^{-6}$/° C., and the compressive strength in the direction of the flow channel was 10.0 to 11.0 MPa, both of which satisfy the requirements.

Examples 23 and 24

In Example 23, a cordierite honeycomb structure was produced in the same manner as in Example 11, except that the used firing atmosphere was a nitrogen atmosphere having an oxygen concentration of 0%.

In Example 24, a cordierite honeycomb structure was produced in the same manner as in Example 11, except that the used firing atmosphere was an oxygen atmosphere having an oxygen concentration of 100%.

The obtained cordierite honeycomb structures were evaluated in the same manner as before. The results are also shown in Table 3.

In comparison with the cordierite honeycomb structures in Comparative Example 1, the cordierite honeycomb structures prepared in Examples 23 and 24, where a portion of the cordierite constituting element Si was replaced by an element having a smaller valence than Si, had a reduced oxygen content of the honeycomb structure, a reduced amount of oxygen contained in the unit lattice of the cordierite crystal, and a smaller lattice constant of the $b_0$ axis of the cordierite crystal. It is therefore clear that oxygen vacancies were formed in the cordierite crystals. Here, when Examples 23 and 24 are compared, the characteristics of the obtained cordierite honeycomb structures are not very different from each other, although the oxygen concentration was different in these Examples. Therefore, it may be concluded that the oxygen concentration of an oxygen atmosphere does not have an effect on the characteristics of the cordierite honeycomb structure.

When Pt was supported on the cordierite honeycomb structure, the amount of Pt supported was 0.20 to 0.25 g/l in the case of water as the solvent and 3.01 to 4.98 g/l in the case of ethanol as the solvent. The thermal expansion coefficient was 0.85 to $0.90 \times 10^{-6}$/° C. and the compressive strength was 12.4 to 16.6 MPa, both of which satisfy the requirements.

TABLE 3

| Sample | Specific cordierite material | Firing atmosphere | Oxygen content (wt %) | Number of oxygen | Lattice constant $b_0$ (Å) | Pt supported amount (g/L) | | Thermal expansion coefficient ($\times 10^{-6}$/° C.) | Compressive strength (MPa) | Remarks |
|---|---|---|---|---|---|---|---|---|---|---|
| | | | | | | Aqueous solution | Ethanol solution | | | |
| Example 11 | $Fe_2O_3$ | Air atmosphere | 46.5 | 17.0 | 16.98 | 0.23 | 2.62 | 0.86 | 12.5 | Si was replaced by Fe |
| Example 12 | $Ga_2O_3$ | Air atmosphere | 45.5 | 16.6 | 16.98 | 0.15 | 5.31 | 0.89 | 16.7 | Si was replaced by Ga |
| Example 13 | $GeO_2$ | Air atmosphere | 48.5 | 17.7 | 17.01 | 1.24 | 1.80 | 0.74 | 14.1 | Al was replaced by Ge |
| Example 14 | $MoO_3$ | Air atmosphere | 48.5 | 17.7 | 16.98 | 0.69 | 0.67 | 0.80 | 11.9 | Al was replaced by Mo |
| Example 15 | $Fe_2O_3$ | Air atmosphere | 49.5 | 18.1 | 16.96 | 0.28 | 3.96 | 0.68 | 13.3 | Mg was replaced by Fe |

TABLE 3-continued

| Sample | Specific cordierite material | Firing atmosphere | Oxygen content (wt %) | Number of oxygen | Lattice constant $b_0$ (Å) | Pt supported amount (g/L) Aqueous solution | Pt supported amount (g/L) Ethanol solution | Thermal expansion coefficient (×10$^{-6}$/° C.) | Compressive strength (MPa) | Remarks |
|---|---|---|---|---|---|---|---|---|---|---|
| Example 16 | Ga$_2$O$_3$ | Air atmosphere | 49.0 | 17.9 | 17.01 | 0.41 | 0.71 | 0.62 | 14.8 | Mg was replaced by Ga |
| Example 17 | GeO$_2$ | Air atmosphere | 48.5 | 17.7 | 17.02 | 0.90 | 2.04 | 0.57 | 12.2 | Mg was replaced by Ge |
| Example 18 | MoO$_3$ | Air atmosphere | 52.0 | 19.0 | 17.01 | 0.27 | 1.25 | 0.95 | 10.8 | Mg was replaced by Mo |
| Example 19 | Fe$_2$O$_3$ | Reduced pressure atmosphere 6.7 × 10$^{-4}$ pa | 45.0 | 16.5 | 16.96 | 0.48 | 2.77 | 0.91 | 10.5 | Si was replaced by Fe |
| Example 20 | Ga$_2$O$_3$ | Reduced pressure atmosphere 6.7 × 10$^{-4}$ pa | 44.5 | 16.3 | 16.96 | 0.25 | 6.29 | 0.93 | 11.0 | Si was replaced by Ga |
| Example 21 | Fe$_2$O$_3$ | Hydrogen atmosphere | 44.0 | 16.1 | 16.94 | 0.68 | 10.15 | 0.98 | 10.0 | Si was replaced by Fe |
| Example 22 | Ga$_2$O$_3$ | Hydrogen atmosphere | 43.0 | 15.7 | 16.94 | 0.56 | 8.69 | 0.95 | 10.6 | Si was replaced by Ga |
| Example 23 | Fe$_2$O$_3$ | Nitrogen atmosphere (O$_2$: 0%) | 46.5 | 17.0 | 16.98 | 0.25 | 3.01 | 0.85 | 12.4 | Si was replaced by Fe |
| Example 24 | Ga$_2$O$_3$ | Oxygen atmosphere (O$_2$: 100%) | 45.5 | 16.6 | 16.98 | 0.20 | 4.98 | 0.90 | 16.6 | Si was replaced by Ga |

Examples 25 to 36

As the cordierite materials, talc, kaolin, alumina and aluminium hydroxide were used and formulated into a near theoretical cordierite composition. In the same manner as in Example 1, the cordierite materials were added to a binder, a lubricant and a humidicant in appropriate amounts, formed into a honeycomb shape, and then fired in air at 1390° C. for 2 hours, to obtain a honeycomb structure.

After the cordierite honeycomb structure was cooled to room temperature, the obtained cordierite honeycomb structure was subjected to a thermal shock by heating the honeycomb structure up to a temperature of the sum of the room temperature plus an intended thermal shock temperature difference followed by dropping the heated honeycomb structure into water. The thermal shock temperature difference was varied in a range of 150 to 900° C. in Examples 25 to 30 as shown in Table 4.

Also, in Examples 31 to 36, in the course of cooling from the firing temperature of 1390° C. above, when the =cordierite honeycomb structure was cooled to a temperature of the sum of the room temperature plus an intended thermal shock temperature difference, air was blown to the honeycomb structure in the direction of the flow channel to provide a thermal shock to the honeycomb structure. The thermal shock temperature difference was varied in a range of 150 to 900° C. in Examples 31 to 36 as shown in Table 4.

The honeycomb structures after the thermal shock were observed by TEM. It was confirmed that fine cracks having a width of 10 nm or less were formed in a large number at interfaces between the cordierite crystal phases and the amorphous phases.

The Pt supporting amount, the thermal expansion coefficient and the compressive strength in the direction of the flow channel of the honeycomb structures were evaluated. The results are shown in Table 4.

As seen in Table 4, the Pt supporting amount was in a range of 0.88 to 1.64 g/l in the case of water as the solvent and in a range of 3.18 to 4.77 g/l in the case of ethanol, which indicates that supporting Pt was made possible by the fine cracks. The thermal expansion coefficient was 0.28 to 0.39×10$^{-6}$/° C., and the compressive strength in the direction of the flow channel was 13.0 to 17.0 MPa, both of which satisfy the requirements.

TABLE 4

| Sample | Temperature difference of thermal shock (° C.) | Pt supported amount (g/L) Aqueous solution | Pt supported amount (g/L) Ethanol solution | Thermal expansion coefficient (×10$^{-6}$/° C.) | Compressive strength (MPa) | Remarks |
|---|---|---|---|---|---|---|
| Example 25 | 150 | 1.35 | 3.43 | 0.29 | 16.8 | Re-heating |
| Example 26 | 300 | 1.57 | 4.22 | 0.29 | 15.9 | Re-heating |
| Example 27 | 450 | 0.88 | 3.18 | 0.32 | 15.1 | Re-heating |
| Example 28 | 600 | 0.90 | 4.26 | 0.37 | 14.2 | Re-heating |
| Example 29 | 750 | 1.44 | 4.61 | 0.37 | 13.6 | Re-heating |
| Example 30 | 900 | 1.06 | 4.77 | 0.36 | 13.0 | Re-heating |

TABLE 4-continued

| Sample | Temperature difference of thermal shock (° C.) | Pt supported amount (g/L) Aqueous solution | Pt supported amount (g/L) Ethanol solution | Thermal expansion coefficient ($\times 10^{-6}$/° C.) | Compressive strength (MPa) | Remarks |
|---|---|---|---|---|---|---|
| Example 31 | 150 | 0.98 | 3.33 | 0.29 | 17.0 | During cooling |
| Example 32 | 300 | 1.64 | 4.13 | 0.28 | 16.1 | During cooling |
| Example 33 | 450 | 1.33 | 3.76 | 0.34 | 15.3 | During cooling |
| Example 34 | 600 | 1.20 | 4.01 | 0.38 | 14.8 | During cooling |
| Example 35 | 750 | 1.03 | 4.35 | 0.37 | 14.0 | During cooling |
| Example 36 | 900 | 1.10 | 4.44 | 0.39 | 13.2 | During cooling |

Examples 37 to 39

In Example 37, $Ga_2O_3$, an oxide of an element having a smaller valence than Si, was used for 10% by weight of the Si source, and talk, kaolin, alumina and aluminum hydroxide were used as the other Si, Al and Mg sources to formulate a near theoretical cordierite composition. The thus prepared cordierite materials were formed into a honeycomb shape, heated to remove a binder and then fired at 1390° C. in an air atmosphere for 2 hours to produce a cordierite honeycomb structure, in the same manner as in Example 1.

The obtained cordierite honeycomb structure was cooled to room temperature and re-heated to 320° C., at which temperature the re-heated honeycomb structure was dropped into water for rapid cooling or applying a thermal shock. Pt was supported onto the thus treated honeycomb structure by CVD. While a carrier gas of nitrogen was flowed at 20 l/min, platinum acetylacetonate was heated and sublimated at 180° C., to adsorb Pt on the honeycomb structure for 1 hour and the honeycomb structure was then heat-treated in air at 800° C. for 2 hours. The amount of Pt supported on the obtained honeycomb structure was measured to be 1.22 g/l.

In Examples 38 and 39, $GeO_2$, an oxide of an element having a larger valence than Al, was used for 10% by weight of the Al source, and talk, kaolin, alumina and aluminum hydroxide were used as the other Si, Al and Mg sources to formulate a near theoretical cordierite composition. The thus prepared cordierite materials were formed into a honeycomb shape, heated to remove a binder and then fired at 1390° C. in an air atmosphere for 2 hours to produce a cordierite honeycomb structure, in the same manner as in Example 1. In the course of cooling from the firing temperature of 1390° C., the honeycomb structure, when the temperature became 320° C., was dropped into water (at 20° C.) to apply a thermal shock.

In Example 38, Pt was supported onto the obtained honeycomb structure by PVD, specifically sputtering. The target was Pt, the sputtering gas was Ar, the reaction pressure was 1.3 Pa, the radio frequency was 13,56 MHz, the supplied power was 100 W and the sputtering time period was 10 minutes. In Example 39, Pt was supported onto the obtained honeycomb structure using a super critical fluid. The super critical fluid used was $CO_2$ in which the honeycomb structure was immersed for 5 minutes. The amount of the supported Pt was 1.01 g/l in Example 38 and 1.55 g/l in Example 39.

Table 5 shows the characteristics of the honeycomb structures in Examples 37 to 39, evaluated in the same manner as described before. It is seen in Table 5 that oxygen vacancies were formed because of its oxygen content, number of oxygen and lattice constant in Example 37, and lattice defects were formed because of their oxygen content, number of oxygen and lattice constant in Examples 38 and 39.

When the honeycomb structures of Examples 37 to 39 were observed by TEM, a large number of fine cracks having a width of several nanometers or less were formed near the interfaces between the cordierite crystal phases and the amorphous phases of the honeycomb structure. Therefore, it is seen that when a cordierite-constituting element is replaced by an element having a different valence and a thermal shock is applied, both the fine pores by the oxygen vacancies or lattice defects as well as the fine pores by the fine cracks are formed.

In Examples 37 to 39, the thermal expansion coefficient was 0.59 to $0.75 \times 10^{-6}$/° C., and the compressive strength in the direction of the flow channel was 10.1 to 10.6 MPa, both of which satisfy the requirements.

TABLE 5

| Sample | Specific cordierite material | Firing atmosphere | Oxygen content (wt %) | Number of oxygen | Lattice constant $b_0$ (Å) | Temperature difference of thermal shock (° C.) | Pt supported amount (g/L) | Thermal expansion coefficient ($\times 10^{-6}$/° C.) | Compressive strength (MPa) | Remarks |
|---|---|---|---|---|---|---|---|---|---|---|
| Example 37 | $Ga_2O_3$ | Air atmosphere | 45.5 | 16.6 | 16.98 | 300 | 1.22 | 0.75 | 10.6 | Si was replaced by Ga Thermal shock by re-heating |
| Example 38 | $GeO_2$ | Air atmosphere | 48.5 | 17.7 | 17.01 | 300 | 1.01 | 0.61 | 10.4 | Al was replaced by Ge Thermal shock during cooling step |

TABLE 5-continued

| Sample | Specific cordierite material | Firing atmosphere | Oxygen content (wt %) | Number of oxygen | Lattice constant $b_0$ (Å) | Temperature difference of thermal shock (° C.) | Pt supported amount (g/L) | Thermal expansion coefficient ($\times 10^{-6}$/° C.) | Compressive strength (MPa) | Remarks |
|---|---|---|---|---|---|---|---|---|---|---|
| Example 39 | $GeO_2$ | Air atmosphere | 48.5 | 17.7 | 17.01 | 300 | 1.55 | 0.59 | 10.1 | Al was replaced by Ge Thermal shock during cooling step |

Examples 40 to 42

In Example 40, talc, kaolin, alumina and aluminum hydroxide were used as the Si, Al and Mg sources and were formulated into a near theoretical cordierite composition and the cordierite materials were further added with 0.05% by weight of $NaCO_3$ as a compound of an alkali metal element. The prepared cordierite materials were formed into a honeycomb shape, heated to remove a binder and then fired at 1390° C. in an air atmosphere for 2 hours to produce a cordierite honeycomb structure, in the same manner as in Example 1. The obtained cordierite honeycomb structure was rapid cooled to room temperature by dropping into water (at 20° C.) from 320° C. in the course of cooling from the firing at 1390° C. to apply a thermal shock.

Example 40 was repeated to produce a cordierite honeycomb structure, but the firing was carried out in a reduced pressure atmosphere having a pressure of 4000 MPa in Example 41 and in a reducing atmosphere of a hydrogen atmosphere in Example 42. The obtained cordierite honeycomb structures were cooled to room temperature (25° C.) and then re-heated to 325° C. and air was blown to apply a thermal shock.

The obtained honeycomb structures were measured for their thermal expansion coefficient and compressive strength. The results are shown in Table 6. In Examples 40 to 42, the thermal expansion coefficient was 0.42 to 0.58×$10^{-6}$/° C., and the compressive strength in the direction of the flow channel was 10.8 to 12.1 MPa, both of which satisfy the requirements.

When the honeycomb structures of Examples 40 to 42 were observed by TEM, a large number of fine cracks having a width of several nanometers or less were formed near the interfaces between the cordierite crystal phases and the amorphous phases of the honeycomb structure.

The honeycomb structures of Examples 40 to 42 were immersed in a solution of 0.07 mol/1-chloroplatinic acid and 0.05 mol/1-rhodium chloride in ethanol while applying an ultrasonic wave for 10 minutes. The honeycomb structures were then blown with an air flow under $1 \times 10^{-5}$ Pa (1 kgf/cm$^2$) to dry and then fired in air at 800° C. for 2 hours. The thus Pt supported honeycomb structures were subjected to X-ray fluorescence spectroscopy to analyze the supported amounts of Pt and Rh. The honeycomb structure of Example 40 supported 1.2 g/l of Pt and 0.2 g/l of Rh, Example 41 supported 1.3 g/l of Pt and 0.3 g/l of Rh, and Example 42 supported 1.1 g/l of Pt and 0.2 g/l of Rh.

For comparison, Pt and Rh were similarly supported on the honeycomb structures of Examples 29 and 35, in which a thermal shock was applied but $Na_2CO_3$ was not added. The honeycomb structure of Example 29 supported 0.7 g/l of Pt and 0.2 g/l of Rh and Example 35 supported 0.5 g/l of Pt and 0.2 g/l of Rh, which are less than the amounts of the supported Pt and Rh in Examples 40 to 42. It is considered that in Examples 40 to 42, more fine cracks were formed by the thermal shock because the amorphous phase was increased by addition of $Na_2CO_3$.

TABLE 6

| Sample | Temperature difference of thermal shock (° C.) | Catalyst supported amount (g/L) | | Thermal expansion coefficient ($\times 10^{-6}$/° C.) | Compressive strength (MPa) | Remarks |
|---|---|---|---|---|---|---|
| | | Pt | Rh | | | |
| Example 40 | 300 | 1.2 | 0.2 | 0.42 | 12.1 | $Na_2CO_3$: 0.5 wt % addition Firing in air During cooling |
| Example 41 | 300 | 1.3 | 0.3 | 0.58 | 11.3 | $Na_2CO_3$: 0.5 wt % addition Reduced pressure atmosphere Re-heating |
| Example 42 | 300 | 1.1 | 0.2 | 0.52 | 10.8 | $Na_2CO_3$: 0.5 wt % addition Firing in reducing atmosphere Re-heating |
| Example 43 | — | 1.9 | 0.2 | 0.38 | 10.6 | Firing in air Ultrasonic wave application |

Example 43

As the cordierite materials, talc, kaolin, alumina and aluminium hydroxide were used and formulated into a near theoretical cordierite composition. In the same manner as in Example 1, the cordierite materials were added to a binder, a lubricant and a humidicant in appropriate amounts, formed into a honeycomb shape, and then fired in air at 1390° C. for 2 hours, to obtain a honeycomb structure. A shock wave of a focused ultrasound with a frequency of 29 kHz and a power of 100 W was applied to the obtained honeycomb structure. In the same manner as in Examples 40 to 42, catalyst components (Pt and Rh) were supported on the obtained cordierite honeycomb structure and the amounts of the supported Pt and Rh were measured. Also, the thermal expansion coefficient and the compressive strength in the direction of the flow channel were measured. The results are shown in Table 6.

As seen in Table 6, the amount of the supported Pt was 1.9 g/l and the amount of the supported Rh was 0.2 g/l. The thermal expansion coefficient was $0.38 \times 10^{-6}/°$ C., and the compressive strength in the direction of the flow channel was 10.6 MPa, both of which satisfy the requirements.

By observing the honeycomb structure, it was confirmed that fine cracks having a width of a few nanometers were formed in a large number at interfaces between the cordierite crystal phases and the amorphous phases.

Examples 44 to 46

As the cordierite materials, talc, kaolin, alumina and aluminium hydroxide were used and formulated into a near theoretical cordierite composition. In the same manner as in Example 1, the cordierite materials were added to a binder, a lubricant and a humidicant in appropriate amounts, formed into a honeycomb shape, and then fired in air at 1390° C. for 2 hours, to obtain honeycomb structures.

The obtained honeycomb structure was immersed in high temperature and high pressure water at 10 MPa and 300° C. for 1 hour in Example 44. Similarly, the obtained honeycomb structure was immersed in super critical fluid $CO_2$ for 30 minutes in Example 45, and in an aqueous solution of sodium hydroxide of 1 mol/l at 60° C. for 5 hours in Example 46.

The amounts of the supported catalyst components (Pt and Rh), the thermal expansion coefficient and the compressive strength in the direction of the flow channel were measured. The results are shown in Table 7.

In Examples 44 to 46, the amount of the supported Pt was 1.5 to 2.3 g/l, the amount of the supported Rh was 0.2 to 0.3 g/l, confirming that fine pores capable to support a catalyst component were formed. The thermal expansion coefficient was 0.35 to $0.39 \times 10^{-6}/°$ C., and the compressive strength in the direction of the flow channel was 11.2 to 12.2 MPa, both of which satisfy the requirements.

TABLE 7

| Sample | Treatment condition | Catalyst supported amount (g/L) Pt | Rh | Thermal expansion coefficient ($\times 10^{-6}/°$ C.) | Compressive strength (MPa) | Remarks |
|---|---|---|---|---|---|---|
| Example 44 | High temperature and high pressure water (10 MPa, 300° C.) | 1.5 | 0.3 | 0.39 | 11.9 | Firing in air |
| Example 45 | Super critical fluid ($CO_2$) | 2.3 | 0.3 | 0.37 | 11.2 | Firing in air |
| Example 46 | Aqueous solution of sodium hydroxide (1 mol/L, 60° C.) | 2.1 | 0.2 | 0.35 | 12.2 | Firing in air |

Example 47 and 48

As the cordierite materials, talc, kaolin, alumina and aluminium hydroxide were used and formulated into a near theoretical cordierite composition. In the same manner as in Example 1, the cordierite materials were added with a binder, a lubricant and a humidicant in appropriate amounts, formed into a honeycomb shape, and then fired in air at 1390° C. for 2 hours, to obtain honeycomb structures.

In Example 47, the obtained honeycomb structure was dry etched with $CF_4$. The conditions of the dry etching was a $CF_4$ flow rate of 150 ml/min, a reaction chamber pressure of 13.3 Pa, an applied radio frequency of 13.56 MHz, a supplied power of 300 W and an etching duration of 10 minutes. In Example 48, similarly, dry etching was carried out with Ar under the conditions of a reaction chamber pressure of 1.3 Pa, an applied radio frequency of 13.56 MHz, a supplied power of 100 W and an etching duration of 10 minutes.

The amounts of the supported catalyst components (Pt and Rh), the thermal expansion coefficient and the compressive strength in the direction of the flow channel were measured. The results are shown in Table 8.

In Examples 47 to 48, the amount of the supported Pt was 1.1 to 1.3 g/l, and the amount of the supported Rh was 0.2 to 0.3 g/l, confirming that fine pores capable to support a catalyst component were formed. The thermal expansion coefficient was 0.45 to $0.46 \times 10^{-6}/°$ C., and the compressive strength in the direction of the flow channel was 11.7 to 12.7 MPa, both of which satisfy the requirements.

The results of the evaluation of Examples 47 and 48 are shown in Table 8.

TABLE 8

| Sample | Treatment condition | Catalyst supported amount (g/L) Pt | Rh | Thermal expansion coefficient (×10⁻⁶/° C.) | Compressive strength (MPa) | Remarks |
|---|---|---|---|---|---|---|
| Example 47 | Dry etching (CF$_4$) | 1.1 | 0.3 | 0.46 | 11.7 | Firing in air |
| Example 48 | Sputter etching (Ar) | 1.3 | 0.2 | 0.45 | 12.7 | Firing in air |

Examples 49 to 51

In Example 49, as the cordierite materials, talc, kaolin, alumina and aluminium hydroxide were used, but 5% by weight of the Si source was replaced by CeO$_2$, and formulated into a near theoretical cordierite composition. In the same manner as in Example 1, the cordierite materials were added with a binder, a lubricant and a humidicant in appropriate amounts, formed into a honeycomb shape, heated in air to 800° C. to remove the binder and then fired in a reduced pressure atmosphere under 4000 Pa at 1390° C. for 2 hours, to obtain a cordierite honeycomb structure.

In Example 50, a cordierite honeycomb structure was produced in the similar manner as in Example 49, but 5% by weight of the Al source, not the Si source, was replaced by CeO$_2$ and the firing atmosphere was a reducing atmosphere of a hydrogen atmosphere.

In Example 51, a cordierite honeycomb structure was produced in the similar manner as in Example 49, but 5% by weight of the Mg source, not the Si source, was replaced by CeO$_2$ and the firing atmosphere was an air atmosphere.

The obtained cordierite honeycomb structures were evaluated in their thermal expansion coefficient and the compressive strength in the direction of the flow channel.

As seen in Table 9, the thermal expansion coefficient was 0.78 to 0.98×10⁻⁶/° C., and the compressive strength in the direction of the flow channel was 10.8 to 12.1 MPa, both of which satisfy the requirements.

When catalyst components (Pt and Rh) were supported on the honeycomb structures of Examples 49 to 51, the amounts of the supported Pt and Rh were 1.5 to 2.3 g/l of Pt and 0.2 to 0.3 g/l of Rh, confirming that fine pores capable of supporting a catalyst component were formed by incorporating CeO$_2$ in the cordierite honeycomb structure. The amount of the supported catalyst components of Examples 49 to 51 is equivalent to that in the three way converter catalyst (1.5 g/l).

The results of the evaluation in Examples 49 to 51 are shown in Table 9.

TABLE 9

| Sample | Replacing element | Oxygen storage capacity (O$_2$ mol/ CeO$_2$ mol) | Catalyst supported amount (g/L) Pt | Rh | Thermal expansion coefficient (×10⁻⁶/° C.) | Compressive strength (MPa) | Remarks |
|---|---|---|---|---|---|---|---|
| Example 49 | GeO$_2$ | 4.2 × 10⁻² | 1.5 | 0.3 | 0.98 | 11.6 | Si was replaced by Ce Firing in reduced pressure atmosphere |
| Example 50 | GeO$_2$ | 3.1 × 10⁻² | 2.3 | 0.3 | 0.86 | 12.1 | Al was replaced by Ce Firing in reducing atmosphere |
| Example 51 | GeO$_2$ | 9.6 × 10⁻² | 2.1 | 0.2 | 0.78 | 10.8 | Mg was replaced by Ce Firing in air |

The oxygen storage capacity of the cordierite honeycomb structures of Examples 49 to 51 was evaluated. The evaluation of the oxygen storage capacity was made by TG-DTA (Rigaku: TAS-200). The produced Ce-substituted cordierite honeycomb structures were pulverized, and 20 mg of the pulverized powder was kept at 500° C., while an oxygen atmosphere of 50% of O$_2$, with the balance being N$_2$, and a reducing atmosphere of 2% of H$_2$, with the balance being N$_2$, were repeated twice. The amount of the released oxygen was calculated from the weight difference between the oxygen atmosphere and the reducing atmosphere. This amount of the released oxygen was divided by the amount of the CeO$_2$ contained in the cordierite honeycomb structure to obtain the amount of the released oxygen per 1 mol of CeO$_2$ contained in the cordierite honeycomb structure, that is, the oxygen storage capacity. The oxygen storage capacity is also shown in Table 9.

For comparison, the oxygen storage capacity of a cordierite honeycomb structure without a Ce substitution was also evaluated and that of a three way converter catalyst with CeO$_2$ supported thereon, in which the amount of the supported CeO$_2$ was made to be 75 g/l, 1.5 times the usual supported amount, was also evaluated. As a result, the cordierite honeycomb structure without a Ce substitution did not have an oxygen storage capacity and the three way converter catalyst with CeO$_2$ supported thereon had an oxygen storage capacity of 1.5×10⁻²O$_2$ mol/CeO$_2$ mol. In contrast, the oxygen storage capacities of Examples 49 to 51 were in a range of 3.1 to 9.6×10⁻² O$_2$ mol/CeO$_2$ mol, which was larger than that of the three way catalyst.

The content of $CeO_2$ in Example 51, having the highest oxygen storage capacity, was only about 2% by weight. The amount of the oxygen which can be stored by 1 liter of the cordierite honeycomb structure of Example 51 and that by 1 liter of the three way catalyst (75 g/l of the supported $CeO_2$) were almost equal to each other. The experiment of Example 51, in which Mg was replaced by Ce, was repeated and the content of $CeO_2$ in the cordierite honeycomb structure of Example 51 was varied. The oxygen storage capacity was significantly reduced, to a level where it was difficult to detect, when the content of $CeO_2$ in the cordierite honeycomb structure was 0.01% by weight. Accordingly, at least 0.01% by weight of the content of $CeO_2$ is necessary to provide an oxygen storage capacity.

Examples 52 and 53

In Example 52, as the cordierite materials, talc, kaolin, alumina and aluminium hydroxide were used but 1.2% by weight of the Mg source was replaced by Pt, and they were formulated into a near-theoretical cordierite composition. In the same manner as in Example 1, the cordierite materials were added with a binder, a lubricant and a humidicant in appropriate amounts, formed into a honeycomb shape and then fired in an air atmosphere at 1390° C. for 2 hours, to obtain a cordierite honeycomb structure.

The obtained cordierite honeycomb structure had a Pt content of 1.7 g/l. The cordierite honeycomb structure was evaluated in its thermal expansion coefficient and the compressive strength in the direction of the flow channel. As seen in Table 10, the thermal expansion coefficient was $0.85 \times 10^{-6}$/° C., and the compressive strength in the direction of the flow channel was 10.9 MPa, both of which satisfy the requirements.

In Example 53, a cordierite honeycomb structure was produced in the similar manner as in Example 52, but 1.2% by weight of the Mg source was replaced with an oxide of Pt and 5% by weight of the Al source was replaced by $CeO_2$. After being cooled to room temperature, the honeycomb structure was re-heated to 320° C. and rapidly cooled by being dropped into water (20° C.).

The obtained cordierite honeycomb structures had a Pt content of 1.6 g/l and an oxygen storage capacity of $3.9 \times 10^{-2}$ $O_2$ mol/$CeO_2$ mol. The cordierite honeycomb structure was evaluated in its thermal expansion coefficient and the compressive strength in the direction of the flow channel. As seen in Table 10, the thermal expansion coefficient was $0.96 \times 10^{-6}$/° C., and the compressive strength in the direction of the flow channel was 11.9 MPa, both of which satisfy the requirements.

The results of the evaluation of Examples 52 and 53 are shown in Table 10.

TABLE 10

| Sample | Replacing element | Temperature difference of thermal shock (° C.) | Oxygen storage capacity ($O_2$ mol/$CeO_2$ mol) | Pt content (g/L) | Thermal expansion coefficient ($\times 10^{-6}$/° C.) | Compressive strength (MPa) | Remarks |
|---|---|---|---|---|---|---|---|
| Example 52 | PtO | — | — | 1.7 | 0.85 | 10.9 | Mg was replaced by Pt Firing in air |
| Example 53 | PtO GeO$_2$ | 300 | $3.9 \times 10^{-2}$ | 1.6 | 0.96 | 11.9 | Mg was replaced by Pt Al was replaced by Ce Firing in air Thermal shock by reheating |

(Cleaning Test)

The performance of the thus produced cordierite honeycomb structures in cleaning hydrocarbon was evaluated.

A catalyst component was supported on each of the cordierite honeycomb structures produced in Examples 1, 11 to 18, 25 to 33 and 40 to 53, to form a catalyst-ceramic body. The catalyst-ceramic body was cut out into a cylinder having a diameter of 15 mm and a length of 10 mm. The cylinder of the catalyst-ceramic body was used in the test of cleaning hydrocarbon at various predetermined temperatures in a model gas bench. The model gas comprised 500 ppm of $C_3H_6$, 5% of oxygen and the balance being nitrogen. The SV (space velocity) was 10,000/hour. The temperature at which 50% of $C_3H_6$ in the model gas was cleaned with a catalyst-ceramic body, was made as "50% cleaning temperature". The results are shown in Table 11.

TABLE 11

| Sample | 50% cleaning temperature (° C.) | Catalyst supported amount (g/L) Pt | Catalyst supported amount (g/L) Rh | Supporting method | Remarks |
|---|---|---|---|---|---|
| Comparative Example 8 | 489 | — | — | — | No catalyst |
| Comparative Example 9 | 184 | 1.25 | 0.25 | — | Three way converter catalyst |
| Example 1 | 188 | 1.9 | — | Ethanol solution | |
| Example 11 | 263 | 7.7 | — | Ethanol solution | |
| Example 12 | 233 | 2.3 | — | Ethanol solution | |
| Example 13 | 255 | 8.8 | — | Ethanol solution | |
| Example 14 | 221 | 2.5 | — | Ethanol solution | |
| Example 15 | 238 | 2.4 | — | Ethanol solution | |
| Example 16 | 263 | 2.0 | — | Ethanol solution | |
| Example 17 | 238 | 4.4 | — | Ethanol solution | |
| Example 18 | 187 | 2.4 | — | Ethanol solution | |
| Example 25 | 223 | 1.2 | — | CVD | |
| Example 26 | 233 | 1.0 | — | PVD | |
| Example 27 | 212 | 1.5 | — | Super critical fluid | |
| Example 28 | 204 | 3.7 | — | Ethanol solution | |
| Example 29 | 206 | 4.1 | — | Ethanol solution | |
| Example 30 | 190 | 2.6 | — | Ethanol solution | |
| Example 31 | 194 | 4.1 | — | Ethanol solution | |
| Example 32 | 206 | 3.4 | — | Ethanol solution | |
| Example 33 | 195 | 3.8 | — | Ethanol solution | |
| Example 40 | 221 | 1.2 | 0.2 | Ethanol solution + ultrasonic wave | |
| Example 41 | 202 | 1.3 | 0.3 | Ethanol solution + ultrasonic wave | |
| Example 42 | 206 | 1.1 | 0.2 | Ethanol solution + | |

TABLE 11-continued

| Sample | 50% cleaning temperature (° C.) | Catalyst supported amount (g/L) Pt | Rh | Supporting method | Remarks |
|---|---|---|---|---|---|
| Example 43 | 199 | 1.9 | 0.2 | Ethanol solution + ultrasonic wave | |
| Example 44 | 207 | 1.5 | 0.3 | Ethanol solution + ultrasonic wave | |
| Example 45 | 200 | 2.3 | 0.3 | Ethanol solution + ultrasonic wave | |
| Example 46 | 230 | 2.1 | 0.2 | Ethanol solution + ultrasonic wave | |
| Example 47 | 219 | 1.1 | 0.3 | Ethanol solution + ultrasonic wave | |
| Example 48 | 211 | 1.3 | 0.2 | Ethanol solution + ultrasonic wave | |
| Example 49 | 214 | 0.6 | 0.5 | Ethanol solution + ultrasonic wave | |
| Example 50 | 226 | 1.8 | 1.1 | Ethanol solution + ultrasonic wave | |
| Example 51 | 210 | 1.3 | 0.2 | Ethanol solution + ultrasonic wave | |
| Example 52 | 253 | 1.7 | — | — | |
| Example 53 | 247 | 1.6 | — | — | |

For comparison, the test device without the above catalyst-ceramic body was evaluated (Comparative Example 8), and a three way catalyst comprising a cordierite honeycomb structure with a coating of γ-alumina in an amount of 150 g/l on which 1/25 g/l of Pt and 0.25 g/l of Rh as well as 75 g/l of a co-catalyst $CeO_2$ Were supported (Comparative Example 9) was also evaluated. The results are also shown in Table 11.

As seen in Table 11, the 50% cleaning temperature was high, 500° C., in the case of Comparative Example 8 in which no catalyst-ceramic body was used, and was lowered to 184° C. in the case of the three way catalyst in Comparative Example 9. In contrast, in the cases of Examples of the present invention in which the amount of the supported catalyst component was as much as that of the three way catalyst, the 50% cleaning temperature was equivalent to or slightly higher than that of the three way catalyst, and was about a half of that of the case of non-catalyst-ceramic body. Thus, a high cleaning capability was attained in the Examples.

The relationship between the cleaning capability and the state of the supported catalyst component was examined as below:

Cordierite materials, in which 10% by weight of the Si source was replaced by an oxide of an element having a valence different from Si, $Ga_2O_3$, was prepared, formed into a honeycomb shape, and fired in air at 1390° C. for 2 hours. To the obtained honeycomb structure, catalyst components were supported by immersing in an ethanol solution of 0.07 mol/l of chloroplatinic acid and 0.05 mol/l of rhodium chloride, while ultrasound was being applied, for 10 minutes, drying and firing in air at 800° C. for 2 hours, to form a catalyst-ceramic body (Sample 1). A similar sample prepared without applying ultrasound was made as Sample 2. Sample 2 was heat treated at 1000° C. for 50 hours and the thus heat deteriorated sample was made as Sample 3.

The Samples 1 to 3 were observed by TEM to examine the state of the supported catalyst metal particles. The TEM magnification was ×200,000. The spacing between the catalyst metal particles was measured for 30 particles in one field of view and the measurement was conducted for 5 fields of view to obtain an average spacing between the catalyst metal particles. The results are shown in Table 12.

The 50% cleaning temperature of $C_3H$, was also measured for Samples 1 to 3. They were 254° C., 336° C. and 460° C.

Similarly, the same ceramic support as in Samples 1 to 3 was used and immersed in an aqueous solution of 0.005 mol/l of chloroplatinic acid and 0.003 mol/l of rhodium chloride, dried and fired in air at 800° C. for 2 hours, to form a catalyst-ceramic body (Sample 4). Also, the same ceramic support was immersed in an aqueous solution of 0.0025 mol/l of chloroplatinic acid and 0.0015 mol/l of rhodium chloride, dried and fired in air at 800° C. for 2 hours, to form a catalyst-ceramic body (Sample 5). No ultrasound was applied for Samples 4 and 5 during the supporting of the catalyst component.

The Samples 4 and 5 were observed by TEM at the magnitude of ×50,000. The spacing between the catalyst metal particles was measured in the same manner as for Samples 1 to 3 and the results are also shown in Table 12.

TABLE 12

| Sample No. | 1 | 2 | 3 | 4 | 5 |
|---|---|---|---|---|---|
| 50% cleaning temperature (° C.) | 254 | 336 | 460 | 472 | 484 |
| Average spacing between catalyst metal particles (nm) | 23 | 74 | 108 | 850 | 1009 |

In Table 12, Sample 3, which was deteriorated by heating, had a 50% cleaning temperature of $C_3H_6$ of 460° C. and an average spacing between the catalyst metal particles of 108 nm, beyond 100 nm. As seen in Table 11, the 50% cleaning temperature of $C_3H_6$ by a non-catalyst-ceramic body was 484° C. and, therefore, Sample 3 is considered to have a cleaning capability.

Sample 2 had a 50% cleaning temperature of $C_3H_6$ of 336° C. and an average spacing between the catalyst metal particles of 74 nm, while Sample 1 had a 50% cleaning temperature of $C_3H_6$ of 254° C. and an average spacing between the catalyst metal particles of 23 nm. It is seen that as in the average spacing between the catalyst metal particles decreased, the 50% cleaning temperature lowered.

Sample 4, having an average spacing between the catalyst metal particles of less than 1000 nm, had a 50% cleaning temperature of $C_3H_6$ of 472° C., lower than 484° C. of the non-catalyst-ceramic body, indicating that Sample 4 had a cleaning capability.

However, Sample 5, having an average spacing between the catalyst metal particles of more than 1000 nm, had a 50% cleaning temperature of 484° C., equal to that of the non-catalyst-ceramic body, indicating that Sample 5 did not have a cleaning capability.

Therefore, it can be seen that the average spacing between the catalyst metal particles should be not more than 1000 nm, preferably not more than 100 nm to have a cleaning capability. With a smaller average spacing between the catalyst metal particles, the cleaning capability is improved. When using ultrasound during the supporting step, the catalyst component can be more easily infiltrated in the fine pores of the ceramic support and the average spacing between the catalyst metal particles can be decreased.

The invention claimed is:

1. A process for producing a catalyst-body, comprising:
   preparing cordierite materials comprising a Si source, an Al source and a Mg source as well as a binder, some of said Si, Al and Mg sources being replaced by a noble metal-containing compound,
   forming said cordierite materials into a honeycomb shape,
   heating said honeycomb shape to remove said binder, and
   firing said honeycomb shape in a reduced pressure atmosphere at a pressure of not higher than 4000 Pa, a reducing atmosphere, an oxygen-containing atmosphere or an oxygen-free atmosphere to form a catalyst-ceramic body comprising a ceramic support of a honeycomb structure comprising a cordierite composition.

2. The process according to claim 1, wherein said fired honeycomb structure is further heated to a predetermined temperature and then rapidly cooled from said predetermined temperature.

3. The process according to claim 2, wherein a temperature different between said predetermined temperature and the temperature after said rapid cooling is not more than 900° C.

4. The process for producing a catalyst-ceramic body according to claim 2, wherein said cordierite has a composition corresponding to a composition expressed by $2MgO/2.2Al_2O_3 \cdot 5SiO_3$.

5. The process according to claim 1, wherein said fired honeycomb structure is further rapidly cooled to a predetermined temperature during cooling from a firing temperature.

6. The process according to claim 1, wherein said fired honeycomb structure is further subjected to a shock wave.

7. The process according to claim 6, wherein said shock wave is provided by ultrasound or vibration.

8. A process for producing a catalyst-ceramic body, comprising:
   preparing cordierite materials comprising a Si source, an Al source and a Mg source as well as a binder, some of said Si, Al and Mg sources being replaced by a noble metal-containing compound and a Ce-containing compound,
   forming said cordierite materials into a honeycomb shape,
   heating said honeycomb shape to remove said binder, and
   firing said honeycomb shape in a reduced pressure atmosphere at a pressure of not higher than 4000 Pa, a reducing atmosphere, an oxygen-containing atmosphere or an oxygen-free atmosphere to form a catalyst-ceramic body comprising a ceramic support of a honeycomb structure comprising a cordierite composition.

* * * * *